United States Patent
Saripalle et al.

(10) Patent No.: US 9,836,643 B2
(45) Date of Patent: *Dec. 5, 2017

(54) IMAGE AND FEATURE QUALITY FOR OCULAR-VASCULAR AND FACIAL RECOGNITION

(71) Applicant: EyeVerify Inc., Kansas City, MO (US)

(72) Inventors: Sashi K. Saripalle, Kansas City, MO (US); Vikas Gottemukkula, Kansas City, MO (US); Reza R. Derakhshani, Shawnee, KS (US)

(73) Assignee: EyeVerify Inc., Kansas City, MO (US)

(*) Notice: Subject to any disclaimer, the term of this patent is extended or adjusted under 35 U.S.C. 154(b) by 1 day.

This patent is subject to a terminal disclaimer.

(21) Appl. No.: 15/261,208

(22) Filed: Sep. 9, 2016

(65) Prior Publication Data

US 2017/0206404 A1      Jul. 20, 2017

Related U.S. Application Data

(60) Provisional application No. 62/217,660, filed on Sep. 11, 2015.

(51) Int. Cl.
*G06K 9/00* (2006.01)
*G06K 9/46* (2006.01)
*G06K 9/62* (2006.01)

(52) U.S. Cl.
CPC ....... *G06K 9/00288* (2013.01); *G06K 9/0061* (2013.01); *G06K 9/00228* (2013.01);
(Continued)

(58) Field of Classification Search
CPC ............ G06K 9/0061; G06K 9/00617; G06K 9/00926; G06K 9/6215;
(Continued)

(56) References Cited

U.S. PATENT DOCUMENTS

| 5,291,560 A | 3/1994 | Daugman |
| 5,303,709 A | 4/1994 | Dreher et al. |

(Continued)

FOREIGN PATENT DOCUMENTS

| CN | 1897042 A | 1/2007 |
| CN | 101334916 A | 12/2008 |

(Continued)

OTHER PUBLICATIONS

Maturana et al, "Face recognition with decision tree-based local binary patterns", Springer-Verlag, 2011.*

(Continued)

*Primary Examiner* — Ruiping Li
(74) *Attorney, Agent, or Firm* — Goodwin Procter LLP

(57) ABSTRACT

Biometric enrollment and verification techniques for ocular-vascular, periocular, and facial regions are described. Periocular image regions can be defined based on the dimensions of an ocular region identified in an image of a facial region. Feature descriptors can be generated for interest points in the ocular and periocular regions using a combination of patterned histogram feature descriptors. Quality metrics for the regions can be determined based on region value scores calculated based on texture surrounding the interest points. A biometric matching process for calculating a match score based on the ocular and periocular regions can progressively include additional periocular regions to obtain a greater match confidence.

48 Claims, 6 Drawing Sheets

(52) U.S. Cl.
CPC ..... *G06K 9/00268* (2013.01); *G06K 9/00617* (2013.01); *G06K 9/4642* (2013.01); *G06K 9/6202* (2013.01)

(58) Field of Classification Search
CPC .......... G06K 2009/00932; A61B 5/117; G06T 2207/20112; G06T 2207/30168
USPC ...................................................... 382/117
See application file for complete search history.

(56) References Cited

U.S. PATENT DOCUMENTS

| | | |
|---|---|---|
| 5,632,282 A | 5/1997 | Hay et al. |
| 6,095,989 A | 8/2000 | Hay et al. |
| 6,185,316 B1 | 2/2001 | Buffam |
| 6,542,624 B1 | 4/2003 | Oda |
| 6,760,467 B1 | 7/2004 | Min et al. |
| 6,836,554 B1 | 12/2004 | Bolle et al. |
| 6,839,151 B1 | 1/2005 | Andree et al. |
| 7,031,539 B2 | 4/2006 | Tisse et al. |
| 7,287,013 B2 | 10/2007 | Schneider et al. |
| 7,327,860 B2 | 2/2008 | Derakhshani et al. |
| 7,336,806 B2 | 2/2008 | Schonberg et al. |
| 7,542,590 B1 | 6/2009 | Robinson et al. |
| 7,668,351 B1 | 2/2010 | Soliz et al. |
| 7,801,335 B2 | 9/2010 | Hanna et al. |
| 7,822,238 B2 | 10/2010 | Bolle et al. |
| 7,925,058 B2 | 4/2011 | Lee et al. |
| 7,936,905 B2 | 5/2011 | Takahashi et al. |
| 7,936,926 B2 | 5/2011 | Suzuki et al. |
| 7,962,754 B2 | 6/2011 | Fujii et al. |
| 8,005,277 B2 | 8/2011 | Tulyakov et al. |
| 8,079,711 B2 | 12/2011 | Stetson et al. |
| 8,090,246 B2 | 1/2012 | Jelinek |
| 8,204,279 B2 | 6/2012 | Takahashi et al. |
| 8,235,529 B1 | 8/2012 | Raffle et al. |
| 8,249,314 B2 | 8/2012 | Bolle et al. |
| 8,251,511 B2 | 8/2012 | Stetson et al. |
| 8,279,329 B2 | 10/2012 | Shroff et al. |
| 8,290,221 B2 | 10/2012 | Choi et al. |
| 8,345,945 B2 | 1/2013 | Song et al. |
| 8,355,544 B2 | 1/2013 | Gonzalez Penedo et al. |
| 8,369,595 B1 | 2/2013 | Derakhshani et al. |
| 8,437,513 B1 | 5/2013 | Derakhshani et al. |
| 8,457,367 B1 | 6/2013 | Sipe et al. |
| 8,483,450 B1 | 7/2013 | Derakhshani et al. |
| 8,532,344 B2 | 9/2013 | Connell et al. |
| 8,553,948 B2 | 10/2013 | Hanna |
| 8,699,799 B2 | 4/2014 | Moon et al. |
| 8,811,681 B2 | 8/2014 | Watanabe |
| 8,965,066 B1 | 2/2015 | Derakhshani et al. |
| 2003/0128867 A1 | 7/2003 | Bennett |
| 2005/0281440 A1 | 12/2005 | Pemer |
| 2005/0286801 A1 | 12/2005 | Nikiforov |
| 2006/0029262 A1 | 2/2006 | Fujimatsu et al. |
| 2006/0058682 A1 | 3/2006 | Miller et al. |
| 2006/0110011 A1 | 5/2006 | Cohen et al. |
| 2006/0132790 A1 | 6/2006 | Gutiin |
| 2006/0140460 A1 | 6/2006 | Coutts |
| 2006/0280340 A1 | 12/2006 | Derakhshani et al. |
| 2006/0288234 A1 | 12/2006 | Azar et al. |
| 2007/0110283 A1 | 5/2007 | Hillhouse et al. |
| 2007/0110285 A1 | 5/2007 | Hanna et al. |
| 2007/0217708 A1 | 9/2007 | Bolle et al. |
| 2007/0253608 A1 | 11/2007 | Tulyakov et al. |
| 2007/0286462 A1 | 12/2007 | Usher et al. |
| 2007/0291277 A1 | 12/2007 | Everett et al. |
| 2008/0021840 A1 | 1/2008 | Beenau et al. |
| 2008/0025574 A1 | 1/2008 | Morikawa et al. |
| 2008/0037833 A1 | 2/2008 | Takahashi et al. |
| 2008/0072063 A1 | 3/2008 | Takahashi et al. |
| 2008/0285815 A1 | 11/2008 | Bolle et al. |
| 2008/0298642 A1 | 12/2008 | Meenen |
| 2009/0037978 A1 | 2/2009 | Luque et al. |
| 2009/0136100 A1 | 5/2009 | Shinohara |
| 2009/0175508 A1 | 7/2009 | Connell et al. |
| 2009/0262990 A1 | 10/2009 | Choi et al. |
| 2009/0304272 A1 | 12/2009 | Makadia et al. |
| 2009/0310830 A1 | 12/2009 | Bolle et al. |
| 2010/0092048 A1 | 4/2010 | Pan et al. |
| 2010/0094262 A1 | 4/2010 | Tripathi et al. |
| 2010/0128117 A1 | 5/2010 | Dyer |
| 2010/0142765 A1 | 6/2010 | Hamza |
| 2010/0142767 A1 | 6/2010 | Fleming |
| 2010/0158319 A1 | 6/2010 | Jung et al. |
| 2010/0232659 A1 | 9/2010 | Rahmes et al. |
| 2010/0271471 A1 | 10/2010 | Kawasaki et al. |
| 2010/0309303 A1 | 12/2010 | Sanchez Ramos et al. |
| 2011/0001607 A1 | 1/2011 | Kamakura |
| 2011/0033091 A1 | 2/2011 | Fujii et al. |
| 2011/0058712 A1 | 3/2011 | Sanchez Ramos |
| 2011/0123072 A1 | 5/2011 | Moon et al. |
| 2011/0138187 A1 | 6/2011 | Kaga et al. |
| 2011/0182483 A1 | 7/2011 | Du et al. |
| 2011/0200234 A1 | 8/2011 | Takahashi et al. |
| 2012/0072723 A1 | 3/2012 | Orsini et al. |
| 2012/0150450 A1 | 6/2012 | Monden |
| 2012/0163678 A1 | 6/2012 | Du et al. |
| 2012/0207357 A1 | 8/2012 | Bedros et al. |
| 2012/0288167 A1 | 11/2012 | Sun et al. |
| 2012/0300990 A1 | 11/2012 | Hanna et al. |
| 2013/0028474 A1 | 1/2013 | Silver |
| 2013/0243267 A1 | 9/2013 | Sezille |
| 2014/0016830 A1 | 1/2014 | Wang et al. |
| 2014/0037152 A1 | 2/2014 | Tan et al. |
| 2015/0055839 A1 | 2/2015 | Wu et al. |
| 2016/0379042 A1* | 12/2016 | Bourlai .............. G06K 9/00288 382/118 |

FOREIGN PATENT DOCUMENTS

| | | |
|---|---|---|
| CN | 102496007 A | 6/2012 |
| GB | 2465881 A | 6/2010 |
| GB | 2471192 A | 12/2010 |
| WO | WO-98/25227 A1 | 6/1998 |
| WO | WO-01/88857 A1 | 11/2001 |
| WO | WO-2006/119425 A2 | 11/2006 |
| WO | WO-2007/127157 A2 | 11/2007 |
| WO | WO-2008/030127 A1 | 3/2008 |
| WO | WO-2008/155447 A2 | 12/2008 |
| WO | WO-2010/129074 A1 | 11/2010 |

OTHER PUBLICATIONS

Ojala et al, "Multiresolution Gray-Scale and Rotation Invariant Texture Classification with Local Binary Patterns", IEEE, 2002.*

Woodard et al, "Periocular Region Appearance Cues for Biometric Identification", IEEE, 2010.*

Bao, P. and Xu, D. "Image Registration based on Complex Wavelet Pyramid and HVS Modeling," SPIE Conf. on Wavelet Apps. in Signal and Image Processing VI; 3458:113-125; Jul. 1998.

Bowyer, K.W., et al., "Image Understanding for Iris Biometrics: A Survey," Computer Vision and Image Understanding; 110(2):281-307; May 2008.

Bowyer, K.W., et al., "A Survey of Iris Biometrics Research: 2008-2010," Handbook of Iris Recognition 2013; pp. 15-54; Jan. 2013.

Cavoukian, A. and Stoianov, A., "Biometric Encryption," Encyclopedia of Cryptography and Security (2nd Ed.); pp. 90-98, Oct. 26, 2011.

Cesar Jr. and Costa, "Neurcal Cell Classification by Wavelets and Multiscale Curvature," Biol Cybern; 79:347-360; Oct. 1998.

Chen, Z., et al., "A Texture-Based Method for Classifying Cracked Concrete Surfaces From Digital Images Using Neural Networks," Proc.of Int'l Joint Conf. on Neural Networks, IEEE, San Jose, CA; pp. 2632-2637; Jul. 31-Aug. 5, 2011.

Choi, A. and Tran, C., "Chapter 13: Hand Vascular Pattern Technology," Handbook of Biometrics; pp. 253-270; Nov. 2007.

Choras, R.S., "Ocular Biometrics-Automatic Feature Extraction From Eye Images," Recent Res. in Telecommunications, Informatics, Electronics and Signal Processing; pp. 179-183; May 2011.

(56) References Cited

OTHER PUBLICATIONS

Clausi, D.A. and Jernigan, M.E., "Designing Gabor Filters for Optimal Texture Separability," Pattern Recog; 33(11):1835-1849; Nov. 2000.
CN201310275046.X; Official Action and Search Report (Translated) dated Mar. 23, 2016; 14pgs.
Costa, L.d.F. and Cesar Jr, R.M., "Shape Analysis and Classification: Theory and Practice," CRC Press; pp. 608-615; Dec. 2000.
Crihalmeanu, S., et al., "Enhancement and Registration Schemes for Matching Conjunctival Vasculature," Proc. of the 3rd IAPR/IEEE Int'l Conf. on Biometrics (ICB), Alghero, Italy; pp. 1247-1256; Jun. 2009.
Crihalmeanu, S. and Ross, A., "Multispectral Scleral Patterns for Ocular Biometric Recognition," Pattern Recognition Lett; 33(14):1860-1869; Oct. 2012.
Crihalmeanu, S. and Ross, A., "On the Use of Multispectral Conjunctival Vasculature as a Soft Biometric," Proc. IEEE Workshop on Applications of Computer Vision (WACV), Kona, HI; pp. 204-211; Jan. 2011.
Derakhshani, R.R., et al., Translated Official Action in CN Pub # CN103390153A dated Nov. 3, 2014.
Derakhshani, R.R., et al., Translated Official Action in CN Pub # CN103390153A dated Jan. 15, 2015.
Derakhshani, R.R., et al., "A New Biometric Modality Based on Conjunctival Vasculature," Proc. of the Artificial Neural Networks in Engineering Conf. (Annie), St. Louis, MO; pp. 497-504, Nov. 2006.
Derakhshani, R.R., et al., "A Texture-Based Neural Network Classifier for Biometric Identification Using Ocular Surface Vasculature," Proceedings of Int'l Joint Conf. on Neural Networks (IJCNN), Orlando, FL; 6pgs.; Aug. 2007.
Derakhshani, et al., "A Vessel Tracing Algorithm for Human Conjunctival Vasculature," Abstract in Proc. of the Kansas City Life Sciences Institute Research Day Conf., Kansas City, MO; p. 150; Mar. 2006.
Derakhshani, et al., "Computational Methods for Objective Assessment of Conjunctival Vascularity," Engineering in Medicine and Biology Society (EMBC), Proc.of the 2012 IEEE Engineering in Medicine and Biology Conf., San Diego, CA; 4pgs; Aug. 28-Sep. 1, 2012.
Didaci, L., et al., "Analysis of Unsupervised Template Update in Biometric Recognition Systems," Pattern Recognition Letters, 37:151-160, Feb. 1, 2014.
Geetika, et al "Fuzzy Vault with Iris and Retina: A Review," Int. J Advanced Res. in Computer Sci and Software Eng; 3(4):294-297; Apr. 2013.
Gottemukkula, V., et al., "A Texture-Based Method for Identification of Retinal Vasculature," 2011 IEEE Int'l Conf. on Technologies for Homeland Security, Waltham, MA; pp. 434-439; Nov. 15-17, 2011.
Gottemukkula, V., et al., "Fusing Iris and Conjunctival Vasculature: Ocular Biometrics in the Visible Spectrum," 2012 IEEE Conf. on Technologies for Homeland Security (HST); pp. 150-155; Nov. 13-15, 2012.
Greenspan, H.K. and Goodman, R., "Remote Sensing Image Analysis Via a Texture Classification Neural Network," Adv. Neural Information Proc. Syst; pp. 425-432; Nov. 30-Dec. 3, 1992.
Grigorescu, S.E., et al., "Comparison of Texture Features Based on Gabor Filters," IEEE Transactions on Image Processing; 11(10):1160-1167; Oct. 2002.
Hasan, I., et al., "Dual Iris Based Human Identification," 14th Int'l Conf on. Computer and Information Technology (ICCIT); pp. 79-84; Dec. 22-24, 2011.
He, X. et al.; Three-Class ROC Analysis—A Decision Theoretic Approach Under the Ideal Observer Framework; IEEE Transactions on Med Imaging; 25(5):571-581, May 2006.
"Pulse Phone: Put Your Finger Against the Camera to Check Your Pulse!," accessed on the Internet at http://appbank.us/healthcare/pulse-phone-put-your-finger-against-the-camer-a-to-check-your-pulse-check-your-pulse-every-day-and-keep-control-of-your-health; downloaded Aug. 8, 2012; 12pgs.
Int'l Search Report and Written Opinion of the ISA/EP in PCT/US2013/042889; 11pgs.; dated Oct. 18, 2013.
Int'l Search Report and Written Opinion of the ISA/EP in PCT/US2013/043901; 11pgs.; dated Aug. 22, 2013.
Int'l Search Report and Written Opinion of the ISA/EP in PCT/US2013/043905; 9pgs.; dated Nov. 15, 2013.
Int'l Search Report and Written Opinion of the ISA/EP in PCT/US2014/055826; 11pgs.; dated Dec. 12, 2014.
Invitation to Pay Additional Fees (incl. Annex to Form PCT/ISA/206 Comm Relating to the Results of the Partial Int'l Search) in PCT/US2014/055869; 6pgs.; dated Dec. 18, 2014.
Jung, E. and Hong, K. "Automatic Retinal Vasculature Structure Tracing and Vascular Landmark Extraction from Human Eye Image," ICHIT '06. Int'l Conf. on Hybrid Information Technology, 2006; vol. 2; pp. 161-167; Nov. 9-11, 2006.
Kalka, N.D., et al. "Estimating and Fusing Quality Factors for Iris Biometric Images," IEEE Transactions on Systems, Man and Cybernetics, Part A: Systems and Humans; 40(3):509-524; May 2010.
Khalil-Hani, M. and Bakhteri, R, "Securing Cryptographic Key with Fuzzy Vault Based on a New Chaff Generation Method," 2010 Int'l Conf. on High Performance Computing and Simulation (HPCS); pp. 259-265; Jun. 28-Jul. 2, 2010.
Kirbas, C. and Quek, F.K.H., "Vessel Extraction Techniques and Algorithms: A Survey," Proc. of the Third IEEE Symposium on Bioinformatics and Bioengineering, Computer Society, Bethesda, MD; 8pgs; Mar. 10-12, 2003.
Kollreider, K., et al., "Verifying Liveness by Multiple Experts in Face Biometrics," IEEE Comp Soc Conf. on Computer Vision and Pattern Recognition Workshops, Anchorage, AK; pp. 1-6; Jun. 24-26, 2008.
Kumar, A. and Passi, A., "Comparison and Combination of Iris Matchers for Reliable Personal Authentication," Pattern Recognition; 43:1016-1026; Mar. 2010.
Li, H. and Chutatape, O., "Automated Feature Extraction in Color Retinal Images by a Model Based Approach," IEEE Transactions on Biomed Eng; 51(2):246-254; Feb. 2004.
Liu, Z. et al., "Finger Vein Recognition With Manifold Learning," J Network and Computer Appl; 33(3):275-282; May 2010.
Liu, C., et al., "Gabor Feature Based Classification Using the Enhanced Fisher Linear Discriminant Model for Face Recognition," IEEE Transactions on Image Processing; 11(4):467-476; Apr. 2002.
Meenakshi, V. S. and Padmavathi, G., "Security Analysis of Hardened Retina Based Fuzzy Vault," Int. Conf. on Advances in Recent Technologies in Communication and Computing, 2009, ARTCom '09; pp. 926-930; Oct. 27-28, 2009.
Meenakshi, V. S. and Padmavathi, G., "Securing Iris Templates Using Combined User and Soft Biometric Based Password Hardened Fuzzy Vault," Int. J Computer Sci. and Information Security (IJCSIS); 7(2):1-8; Feb. 2010.
Meenakshi, V. S. and Padmavathi, G., "Securing Revocable Iris and Retinal Templates Using Combined User and Soft Biometric Based Password Hardened Multimodal Fuzzy Vault," Int. J Computer Sci. and Information Security (IJCSIS); 7(5):159-167; Sep. 2010.
Nandakumar, K., et al., "Quality-based Score Level Fusion in Multibiometric Systems," 18th Int'l Conf. on Pattern Recognition; pp. 1-4; Aug. 20-24, 2006.
Ojala, T., et al., "Multi Resolution Gray-Scale and Rotation Invariant Texture Classification with Local Binary Patterns," IEEE Transactions on Pattern Analysis and Machine Intelligence, IEEE Computer Society; 24(7):971-987; Jul. 2002.
Owen, C.G., et al., "Optimal Green (Red-free) Digital Imaging of Conjunctival Vasculature," Opthal Physiol Opt; 22(3):234-243; May 2002.
Proenca, H., "Quality Assessment of Degraded Iris Images Acquired in the Visible Wavelength," IEEE Transactions on Information Forensics and Security; 6(1):82-95; Mar. 2011.
Qamber, S., et al., "Personal Identification System Based on Vascular Pattern of Human Retina," Cairo Int. Biomedical Eng. Conf. (CIBEC) 2012; pp. 64-67; Dec. 2012.

(56) References Cited

OTHER PUBLICATIONS

Randen, T. and Husøy, J.H., "Filtering for Texture Classification: A Comparative Study," IEEE Transactions on Pattern Analysis and Machine Intell.; 21(4):291-310; Apr. 1999.
Saad, M.A., et al., "Model-Based Blind Image Quality Assessment Using Natural DCT Statistics," IEEE Transactions on Image Processing; X(X):1-12; Dec. 2010.
Schwartz, G. and Berry, M.J., "Sophisticated Temporal Pattern Recognition in Retinal Ganglion Cells," J Neurophysiol; 99(4):1787-1798; Feb. 2008.
Simon, D. L., "A Three-Dimensional Receiver Operator Characteristic Surface Diagnostic Metric," Annual Conf. of the Prognostics and Health Management Soc. (PHM 2010); 11pgs.; Oct. 10-16, 2010.
Sun, Z., et al., "Improving Iris Recognition Accuracy Via Cascaded Classifiers," IEEE Transactions on Systems, Man, and Cybernetics—Part C: Applications and Reviews; 35(3):435-441; Aug. 2005.
Tanaka, T. and Kubo, N., "Biometric Authentication by Hand Vein Patterns," Soc. of Instrument and Control Engineers (SICE) Annual Conf., Sapporo, Japan; pp. 249-253; Aug. 4-6, 2004.
Tanaka, H., et al.; Texture Segmentation Using Amplitude and Phase Information of Gabor Filters, Elec.Comm. in Japan, Part. 3; 87(4):66-79; Apr. 2004.
Tankasala, S.P., et al., "Biometric Recognition of Conjunctival Vasculature Using GLCM Features," 2011 Int'l Conf. on Image Information Processing (ICIIP), Waknaghat, India; 6pgs; Nov. 3-5, 2011.
Tankasala, S.P. et al., "Classification of Conjunctival Vasculature Using GLCM Features," 2011 Int'l Conf. on Image Information Processing (ICIIP), Waknaghat, India; 6pgs; Nov. 2011.
Tankasala, S.P., et al., "Visible Light, Bi-Modal Ocular Biometrics," Proc. of the 2012 2nd Int'l Conf. on Communication Computing and Security (ICCCS), Rourkela, India; 9pgs; Oct. 6-8, 2012.
Tavakoli, H.R., et al., "Study of Gabor and Local Binary Patterns for Retinal Image Analysis," 3rd Int'l Workshop on Advanced Computational Intelligence (IWACI); pp. 527-532; Aug. 2010.
Thomas, N.L., et al., "A New Approach for Sclera Vein Recognition," Proc. SPIE 7708, Mobile Multimedia/Image Processing, Security, and Applications 2010; 7708(1):1-10; Apr. 2010.
Toth, B., "Liveness Detection: Iris," Encyclo. Biometrics; 2:931-938; Jan. 2009.
Trefny, J. and Matas, J., "Extended Set of Local Binary Patterns for Rapid Object Detection," Computer Vision Winter Workshop 2010; Feb. 3-5, 2010; 7 pgs.
Ulery, B., et al., "Studies of Biometric Fusion," US Department of Commerce, National Institute of Standards and Technology (NIST); pp. 1-22, Sep. 2006.
Uludag, U., et al., "Biometric Template Selection and Update: A Case Study in Fingerprints," J Pattern Recognition Soc; 37(7):1533-1542, Jul. 2004.
Uludag, U., et al., "Fuzzy Vault for Fingerprints," Lecture Notes in Computer Science; 3546:310-319; Jun. 28, 2005.
Wu, C. and Harada, K., "Extraction and Digitization Method of Blood Vessel in Scleraconjunctiva Image," Int'l J Computer Sci and Network Security; 11(7):113-118; Jul. 2011.
Yoon, S., et al., "Altered Fingerprints: Analysis and Detection," IEEE Trans Pattern Anal Mach Intell.; 34(3):451-464; Mar. 2012.
Zhou, Z., et al., "A Comprehensive Sclera Image Quality Measure," 2010 11th Int'l Conf. Control, Automation, Robotics and Vision (ICARCV), Singapore; pp. 638-643; Dec. 7-10, 2010.
Zhou, Z., et al., "A New Human Identification Method: Sclera Recognition," IEEE Transactions on Systems, Man, and Cybernetics Part A: Systems and Humans; 42(3):571-583; May 2012.
Zhou, Z., et al., "Multi-angle Sclera Recognition System," 2011 IEEE Workshop on Computational Intelligence in Biometrics and Identity Management (CIBIM), Paris; 6pgs; Apr. 11, 2011.
Zhou, Z., et al., "Multimodal Eye Recognition," Mobile Multimedia/Image Processing, Security, and Applications 2010; 7708:1-10; Apr. 2010.
Adams J et al., (2010), 'Genetic-Based Type II Feature Extraction for Periocular Biometric Recognition: Less is More,' 20th International Conference on Pattern Recognition, Aug. 23-26, 2010, Istanbul, Turkey, IEEE Computer Society, Piscataway, NJ (Publ) (3 pages).
Bereta M et al., (2013), 'Local Descriptors in Application to the Aging Problem in Face Recognition,' Pattern Recog, 46(10):2634-46.
Chen C and Ross A, (2013), 'Local Gradient Gabor Pattern (LGGP) with Applications in Face Recognition, Cross-Spectral Matching and Soft Biometrics,' Proc of SPIE, Biometric and Surveillance Technology for Human Activity Identification X, May 2013, Baltimore, MD (14 pages).
Ghodsi A, (2006), 'Dimensionality Reduction a Short Tutorial,' Dept Stat Actuar Sci, University of Waterloo, Ontario, Canada (Publ) (25 pages).
He X et al., (2005), 'Laplacian Score for Feature Section,' *Advances in Neural Information Processing Systems*, (18th Ed, 2005), Y Weiss et al., (Editors), MIT Press, Cambridge, MA (Publ), (8 pages).
Heikkilä M et al., (2009), 'Description of Interest Regions with Local Binary Patterns,' Pattern Recog, 42(3):425-36.
International Search Report (Form ISA/210) and Written Opinion of the International Searching Authority (Form ISA/237) for International Application No. PCT/US2016/0509999 dated Jan. 23, 2017 (16 pages).
Juefei-Xu F et al., (2011), 'Investigating Age Invariant Face Recognition Based on Periocular Biometrics,' Proceedings of the 2011 IEEE International Joint Conference on Biometrics, Oct. 11-13, 2011, Washington, DC, IEEE Computer Society, Piscataway, NJ (Publ) (7 pages).
Miller PE et al., (2010), 'Personal Identification Using Periocular Skin Texture,' SAC'10 Proceedings of the 2010 ACM Symposium on Applied Computing, Mar. 22-26, 2010, Sierre, Switzerland (Publ), 1:1496-500.
Padole CN and Proenca H, (2012),'Periocular Recognition: Analysis of Performance Degradation Factors,' 5th IAPR International Conference on Biometrics (ICB), Mar. 29-Apr. 1, 2012, New Delhi, India, IEEE Computer Society, Piscataway, NJ (Publ) (7 pages).
Park U et al., (2009), 'Periocular Biometrics in the Visible Spectrum: A Feasibility Study,' BTAS '09, IEEE 3rd International Conference on Biometrics: Theory, Applications, and Systems, Sep. 28-30, 2009, Washington, DC, IEEE Computer Society, Piscataway, NJ (Publ) (6 pages).
Park U et al., (2011), 'Periocular Biometrics in the Visible Spectrum,' IEEE Tran Info Forensic, 6(1):96-106.
Proença H, (2014), Ocular Biometrics by Score-Level Fusion of Disparate Experts, IEEE Trans Image Process, Oct. 2, 2014 (ePub), 23(12):5082-93.
Raghavendra R et al., (2013) ,'Combining Iris and Periocular Recognition Using Light Field Camera,' 2nd IAPR Asian Conference on Pattern Recognition, Nov. 6-8, 2013, Naha, Japan, IEEE Computer Society, Piscataway, NJ (Publ) (5 pages).
Raja KB et al., (2014), 'Binarized Statistical Features for Improved Iris and Periocular Recognition in Visible Spectrum,' 2nd International Workshop on Biometrics and Forensics, Mar. 27-28, 2014, Valletta, Malta, IEEE Computer Society, Piscataway, NJ (Publ) (6 pages).
Smereka JM and Vijaya Kumar BVK, (2013), 'What is a 'Good' Periocular Region for Recognition?,' 2013 IEEE Conference on Computer Vision and Pattern Recognition Workshops (CVPRW), Jun. 23-28, 2013, Portland, OR, IEEE Computer Society, Piscataway, NJ (Publ) (8 pages).
Tan C-W and Kumar A, (2013), 'Towards Online Iris and Periocular Recognition Under Relaxed Imaging Constraints,' IEEE Tran Image Process, 22(10):3751-6.
Tan X and Triggs B, (2010), 'Enhanced Local Texture Feature Sets for Face Recognition Under Difficult Lighting Conditions,' IEEE Tran Image Process, 19(6):1635-50.
Woodard DL et al., (2010), 'Periocular Region Appearance Cues for Biometric Identification,' 2010 IEEE Computer Society Conference on Computer Vision and Pattern Recognition Workshops

(56) References Cited

OTHER PUBLICATIONS (CVPRW), Jun. 13-18, 2010, Providence, RI, IEEE Computer Society, Piscataway, NJ (Publ), 2010:162-9.

* cited by examiner

IMAGE AND FEATURE QUALITY FOR OCULAR-VASCULAR AND FACIAL RECOGNITION

CROSS-REFERENCE TO RELATED APPLICATION

This application claims priority to and the benefit of U.S. Provisional Patent Application 62/217,660, filed on Sep. 11, 2015, and entitled "Image Enhancement, Quality Metrics, Feature Extraction, Information Fusion, Pose Estimation and Compensation, and Template Updates for Biometric Systems," the entirety of which is incorporated by reference herein.

BACKGROUND

The present disclosure relates to biometric authentication and, more specifically, to systems and methods for image enhancement, quality metrics, feature extraction, and information fusion for multi-region (sub-ocular to face) or other image-based biometric systems.

Biometric systems can be used to authenticate the identity of an individual to either grant or deny access to a resource. For example, image scanners can be used by a biometric security system to identify an individual based on unique structures on the individual's face, for example, in the individual's eye and its surrounding regions. Biometric data captured from an individual, such as that captured during an enrollment process, can be stored as a template that is used to verify the identity of the individual at a later time. Biometric scanning technology would, however, benefit from improved techniques in using periocular features instead of or in addition to ocular features for enrollment and verification.

BRIEF SUMMARY

Systems and methods relating to biometric techniques applicable to ocular-vascular, periocular, and facial regions are disclosed. In one aspect, a computer-implemented method comprises the steps of: receiving an image of a facial region of a user, the facial region including an eye and an area surrounding the eye; processing the image to define an ocular image region including at least a portion of the eye in the image of the facial region; defining a plurality of periocular image regions each including at least a portion of the area surrounding the eye in the image of the facial region, wherein the periocular regions are defined based on dimensions of the defined ocular region; calculating one or more biometric match scores based on the ocular image region and at least one of the periocular regions; and designating the image of the facial region as authentic or not authentic based on the one or more biometric match scores.

In one implementation, the plurality of periocular image regions comprises at least four periocular image regions. The at least four periocular image regions can comprise a periocular image region disposed below the ocular image region, a periocular image region disposed to the right of the ocular image region, a periocular image region disposed to the left of the ocular image region, and a periocular image region disposed above the ocular image region.

Defining the plurality of periocular image regions can comprise defining a lower periocular image region disposed below the ocular image region, the lower periocular image region having a width substantially equal to a width of the ocular image region width and a height in the range of 10% to 300% of a height of the ocular image region. Defining the plurality of periocular image regions can also comprise defining a right periocular image region disposed to the right of the ocular image region, the right periocular image region having a width in the range of 10% to 80% of a width of the ocular image region and a height of 120% to 550% of a height of the ocular image region. Defining the plurality of periocular image regions can further comprise defining a left periocular image region disposed to the left of the ocular image region, the left periocular image region having a width in the range of 10% to 50% of a width of the ocular image region and a height of 120% to 550% of a height of the ocular image region. Defining the plurality of periocular image regions can also comprise defining an upper periocular image region disposed above the ocular image region, the upper periocular image region having a width substantially equal to a width of the ocular image region width and a height in the range of 10% to 150% of a height of the ocular image region In another implementation, calculating the one or more biometric match scores comprises: calculating a first biometric match score based on the ocular image region and an ocular enrollment template; and in response to determining that the first biometric match score does not meet a first match threshold, calculating a second biometric match score based on the ocular image region, a first one of the periocular image regions, the ocular enrollment template, and a periocular enrollment template. Calculating the one or more biometric match scores can further comprise, in response to determining that the second biometric match score does not meet a second match threshold, calculating one or more further biometric match scores by iteratively including additional ones of the periocular image regions in calculating the further biometric match scores until either a particular further biometric match score meets a corresponding match threshold or no further periocular image regions are available for inclusion. The plurality of periocular image regions can be ranked based at least on discriminative power and/or quality, and the additional periocular image regions can be iteratively included based on the respective rankings of the additional periocular image regions. One or more of the plurality of periocular image regions can be divided into sub-regions based on one or more facial features derived from the periocular image regions, and the additional periocular image regions can be iteratively included based on cluster importance or the respective rankings of the additional periocular image regions.

In a further implementation, calculating the one or more biometric match scores comprises: identifying a first set of pairs of matched points based on the ocular image region and an enrollment template; and identifying a second set of pairs of matched points based on at least one of the periocular image regions and the enrollment template. Calculating the one or more biometric match scores can further comprises: determining one or more inlier matched points by inputting a combination of the first and second sets of pairs of matched points into an outlier detection algorithm; determining that a number of the inlier matched points that correspond to the ocular image region meets a minimum ocular inlier count; and calculating a particular biometric match score based at least in part on the inlier matched points. The minimum ocular inlier count can be equal to 3.

In yet another implementation, calculating the one or more biometric match scores further comprises: determining one or more first inlier matched points by inputting the first set of pairs of matched points into an outlier detection algorithm; determining one or more second inlier matched } points by inputting the second set of pairs of matched points into an outlier detection algorithm; and calculating a particular biometric match score based at least in part on an output of an outlier detection algorithm using a combination of the first and second inlier matched points as input. Calculating the one or more biometric match scores can further comprise determining that a number of inlier matched points, obtained from the output of the outlier detection algorithm, that correspond to the ocular image region meets a minimum ocular inlier count. The minimum ocular inlier count can be equal to 3.

In another aspect, a computer-implemented method comprises the steps of: receiving an image of a facial region of a user, the facial region including an eye and an area surrounding the eye; processing the image to: (i) define an ocular image region including at least a portion of the eye in the image of the facial region and (ii) define one or more periocular image regions each including at least a portion of the area surrounding the eye in the image of the facial region; identifying a plurality of points of interest in at least one of the ocular image region and the one or more periocular image regions; generating, for each point of interest, a feature descriptor based on a combination of a plurality of patterned histogram feature descriptors; and storing the generated feature descriptors in a biometric template.

In one implementation, processing the image comprises enhancing at least a portion of the image using local gradient Gabor pattern (LGGP). Enhancing at least a portion of the image using LGGP can comprise: calculating, at each of a plurality of angles, a Gabor phase image for the at least a portion of the image; aggregating the calculated Gabor phase images to form a combined Gabor phase image; calculating, at each of a plurality of angles, a local gradient of the combined Gabor phase image; and retaining a maximum value of each local gradient to form an enhanced image.

A particular patterned histogram feature descriptor can comprise a patterned histogram of extended multi-radii local binary patterns (PH-EMR-LBP), a patterned histogram of extended multi-radii center symmetric local binary patterns (PH-EMR-CSLBP), or a patterned histogram of extended multi-radii local ternary patterns (PH-EMR-LTP). Generating the feature descriptor for a particular point of interest can comprise generating a PH-EMR-LBP feature descriptor by: defining an image region comprising the particular point of interest; calculating a plurality of local binary pattern (LBP) codes for each pixel in the image region to form a multi-radii LBP (MR-LBP) image; dividing the MR-LBP image into a plurality of sub-regions; deriving a plurality of histograms comprising frequencies of each MR-LBP bit location within each sub-region; and combining the plurality of histograms to form the PH-EMR-LBP feature descriptor. Generating the feature descriptor for a particular point of interest can comprise generating a PH-EMR-CSLBP feature descriptor by: defining an image region comprising the particular point of interest; calculating a plurality of center symmetric local binary pattern (CSLBP) codes for each pixel in the image region to form a multi-radii CSLBP (MR-CSLBP) image; dividing the MR-LBP image into a plurality of sub-regions; deriving a plurality of histograms comprising frequencies of each MR-CSLBP bit location within each sub-region; and combining the plurality of histograms to form the PH-EMR-CSLBP feature descriptor. Generating the feature descriptor for a particular point of interest can comprise generating a PH-EMR-LTP feature descriptor by: defining an image region comprising the particular point of interest; calculating a plurality of local ternary pattern (LTP) codes for each pixel in the image region to form a multi-radii LTP (MR-LTP) image; dividing the MR-LBP image into a plurality of sub-regions; deriving a plurality of histograms comprising frequencies of each MR-LTP bit location within each sub-region; and combining the plurality of histograms to form the PH-EMR-LTP feature descriptor.

In another implementation, generating the feature descriptor for a particular point of interest comprises: calculating a PH-EMR-LBP feature descriptor, PH-EMR-CS-LBP feature descriptor, and PH-EMR-LTP feature descriptor for the particular point of interest; and combining the PH-EMR-LBP feature descriptor, PH-EMR-CS-LBP feature descriptor, and PH-EMR-LTP feature descriptor to form a combined feature descriptor. Generating the feature descriptor for a particular point of interest can further comprise applying a variance analysis to the combined feature descriptor to form a top feature descriptor comprising a subset of features from the combined feature descriptor. Generating the feature descriptor for a particular point of interest can further comprise performing dimensionality reduction on the top feature descriptor to form the feature descriptor for the particular point of interest.

In a further implementation, in generating a particular patterned histogram feature descriptor, local binary pattern or local ternary pattern feature descriptors are calculated using a neighborhood defined by a square with or without corners.

In another aspect, a computer-implemented method comprises the steps of: receiving an image of a facial region of a user, the facial region including an eye and an area surrounding the eye; defining an ocular image region including at least a portion of the eye in the image of the facial region; defining one or more periocular image regions each including at least a portion of the area surrounding the eye in the image of the facial region; identifying a plurality of points of interest in at least one of the ocular image region and the one or more periocular image regions; calculating, for each point of interest, a region value for texture surrounding the point of interest; and determining at least one quality metric for at least a portion of the image of the facial region based on the points of interest and the respective calculated region values.

In one implementation, calculating the region value for a particular point of interest comprises: calculating at least one local binary pattern in a square-shaped neighborhood (BP) for the particular point of interest; and calculating at least one BP for one or more points offset from the particular point of interest. Calculating the region value for the particular point of interest can further comprise setting the region value to an average of region values calculated for the particular point of interest and a plurality of the offset points. Calculating at least one BP for the particular point of interest can comprise calculating a plurality of BPs, each having a different neighborhood, for the particular point of interest, and calculating at least one BP for the offset points can comprise calculating a plurality of BPs, each having a different neighborhood, for each offset point. Calculating the plurality of BPs for a particular point of interest or offset point can comprise: reducing the plurality of BPs to a Noisy Binary Pattern (NBP); and creating a general binary pattern (genBP) from the NBP. Calculating the plurality of BPs for a particular point of interest or offset point can further comprise: creating a weighted pattern H from the genBP; and calculating a region value for the particular point of interest or offset point as:

$$\frac{(L * \sum H)}{144}$$

where L comprises a maximum length of continuous zeros in the genBP. The offset points can comprise a plurality of pixel locations uniformly shifted in different directions from the particular point of interest.

In another implementation, determining the quality metric comprises: creating an ordered list of the points of interest based on respective region values of the points of interest; and calculating distances between consecutive points of interest in the ordered list. Determining the quality metric can further comprise calculating the quality metric as:

$$\sum_{n=1}^{p} s_n * sw_n * dw_n$$

where p comprises the number of points of interest, $s_n$ comprises the region value calculated for point of interest n, $sw_n$ comprises a weighted index for point of interest n, and $dw_n$ comprises a weight for the distance corresponding to point n in the ordered list.

In a further implementation, the at least a portion of the image of the facial region comprises the ocular region or at least one of the periocular regions. The method can further comprise ranking the periocular image regions based on respective quality metrics separately calculated for each of the periocular image regions. The method can further comprise ranking the periocular image regions based on at least one of a respective discriminative power of each periocular image region. The method can further comprise using the periocular image regions in a progressive biometric matcher based at least in part on the respective quality metric and/or discriminative power rankings of the periocular image regions.

In yet another implementation, the method further comprises: determining that a difference in calculated quality metrics between a first one of the ocular or periocular image regions and a second one of the ocular or periocular image regions exceeds a threshold; and indicating a likely presence of a spoof based on the determined difference in calculated quality metrics.

Other aspects of the above include corresponding systems and non-transitory computer-readable media. The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which.

DETAILED DESCRIPTION

Figure 1:
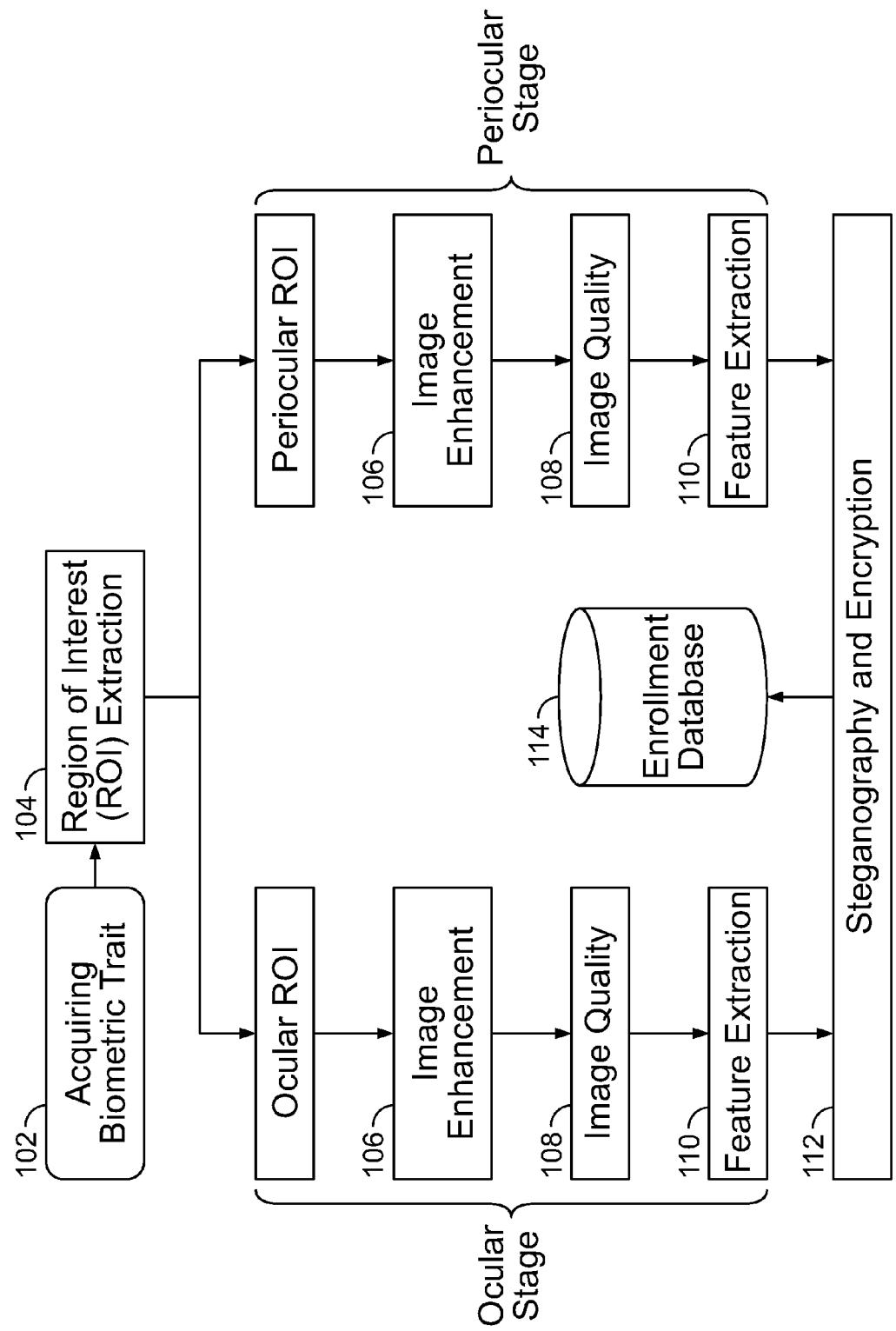
FIG. 1 depicts an example method for creating an ocular and periocular enrollment template, according to an implementation.

The white of the eye includes complex patterns (mostly due to vascular structures), which are not only readily visible and scannable, but are also unique to each individual. In some cases, other non-vascular formations may also be visible and can be taken into account by a biometric matching algorithm. Thus, these visible structures seen on the white of the eye, mostly due to vasculature of the conjunctiva and episclera, can be scanned and advantageously used as a biometric. This biometric can be used to authenticate a particular individual or identify an unknown individual from a larger set of candidates. Implementations of solutions for imaging and pattern matching the blood vessels in the white of the eye and for vascular point detection, feature extraction and matching are described, for example, in U.S. Pat. No. 8,369,595, issued on Feb. 5, 2013, and entitled "Texture Features for Biometric Authentication," and U.S. Pat. No. 9,390,327, issued on Jul. 12, 2016, and entitled "Feature Extraction and Matching for Biometric Authentication," the entireties of which are incorporated by reference herein. To add robustness to these and other biometric verification techniques, described here are methods for progressively including visible non-ocular-vascular structures outside the white of the eye, such as periocular or partial or even complete face or other visible identifiable patterns, into an ocular-vascular biometric matching scheme in the event, for example, that additional information is needed to form a more accurate analysis.

Ocular features are those arising from the patterns seen external to the corneal limbus and bounded by the eyelids, which are mostly due to vascular patterns seen on the white of the eyes. Henceforth, such features are interchangeably referred to herein as ocular or ocular-vascular. The white of the eye has a number of layers. The sclera is an opaque, fibrous, protective, layer of the eye containing collagen and elastic fiber. The sclera is covered by the episclera, which has a particularly large number of blood vessels and veins that run through and over it. The episclera is covered by the bulbar conjunctiva, which is a thin clear membrane that interfaces with the eyelid or the environment when the eyelid is opened, which also contains unique and rich vascular structures. Blood vessels run through all of these layers of the white of the eye and can be detected in images of the eye. The eye also includes eyelashes and sometimes drooping eyelids that can sometimes obscure portions of the white of the eye in an image.

Periocular refers to the immediate region of the face surrounding the eye (external to and, in some instances, abutting the eyelid edges), which is textured and can be used for biometric applications. The periocular region can include one or more regions that can be, but are not necessarily, contiguous, and that can take various forms with respect to shape and size. While the periocular region has no hard-defined boundaries, standardizing the region of interest can minimize registration issues, further improving the accuracy of biometric system. Such standardization can be achieved using certain measurable value from the user face, such as distance between eye corners, radius of iris, inter-ocular distance and/or width and height of the derived eye crop (while using eye detection algorithms). During user authentication, one or more digital images of a user's eye and periocular region are captured, one or more verification templates are generated from the captured image or images, and the identity of the user can be verified by matching the corresponding ocular and periocular structures as expressed in the enrollment and verification templates.

In other implementations, additional regions of the face extending beyond the periocular region can be used in addition to or instead of regions immediately surrounding the eye. For example, when heavy facial expressions are observed, one or more regions on and/or around the nose or on/around the face can be considered as extended periocular regions. In one implementation, facial features can complement ocular features for an eye-based biometric matcher. In another implementation, the ocular features used by an eye-based biometric matcher are complemented by both periocular and extended facial features. In another implementation, an entire face can be used in addition to or instead of the regions immediately surround the eye. The face can complement ocular features for an eye-based biometric matcher. Both periocular and face regions can complement the ocular features used by an eye-based biometric matcher.

In various other implementations, other information such as the skin tone of the periocular region can also be measured and used as a soft biometric. Skin tone can be estimated using histograms of the intensity values of the different color bands of image, such as normalized red, green, and blue (RGB) channels. During verification, the histogram information of the enrollment template can be used to stop a verification process when the distance between histograms of enrollment and verification images are higher than a threshold.

In one implementation, skin tone can be estimated by a clustering technique that identifies the most prominent colors. As one example, the RGB pixels of the periocular region are converted to Lab color space and clustered to N number of classes. The optimal N can be determined by AIC (Akaike Information Criterion) or BIC (Bayesian Information Criterion). Next, these clusters are sorted in ascending order based on their occurrence, and the top three clusters are grouped with the pre-defined skin tones. The closest skin tone can be determined with a distance measure and/or correlation measure. In one implementation, the distance measure is Euclidean distance, although other distance measures are contemplated. Next, the verification procedure can be stopped if the distance and/or correlation between the enrollment and verification image are higher than a threshold. The same process can be applied to other colored parts of the image, such as the iris.

FIG. 1 depicts an example method for creating an ocular and periocular enrollment template. In step 102, one or more images of a user's facial region(s) are captured using an image sensor, e.g., a camera, that can be associated with a device to which access by the user is to be authenticated (e.g., a smartphone, a smart watch, smart glasses, a notebook computer, a tablet computer, etc.). By way of illustration, the camera can be a digital camera, a three-dimensional (3D) camera, a light field sensor and/or a near infrared sensor or other monochromatic and/or multispectral imaging sensor. The images can include one or more ocular regions (regions defining an eye area of the user) and/or one or more periocular regions, as well as other facial regions, in some instances. The images can be captured either in still mode or in video mode or a combination thereof. The images can be captured in various wavelengths. In some implementations, the user is prompted (by visual, or audible, or haptic feedback) to move the device closer/farther to trigger the optimal distance for finding eyes and/or face.

In step 104, an initial region of interest (ROI) is identified, e.g., one or both eyes may be located. Viola-Jones algorithms or similar learning algorithms trained on various different forward-looking eye images can be used for this purpose. In another implementation, Viola-Jones algorithms trained on various different glancing eye images can be used. Thereafter, a gaze tracking algorithm, such as one using Haar filters, can be used to quantize the amount of gaze to acquire one or more images, once a selected gaze direction is detected.

Once the initial ROI is localized on the face shown in the captured image(s), additional computation can be performed to obtain the final ROI on the image. Typically, the final ROIs are cropped to obtain RGB and/or near-infrared images of one or more eyes. Accordingly, as used herein, "image" or "captured image" can also refer to a cropped image of a final ROI.

With reference to FIG. 1, in the Ocular and Periocular Stages, one or more averaged or otherwise enhanced or naturally captured images, which can be enrollment images or verification images, are preprocessed in image enhancement sub-stage 106 and image quality sub-stage 108, and features from the preprocessed images are extracted in feature extraction sub-stage 110, to generate one or more ocular and periocular templates. The preprocessing sub-stages 106 and 108 can include image enhancement and image quality techniques, explained further below. The feature extraction sub-stage 110 can include interest point detection and local descriptor extraction, which are described in detail below. The operations performed during the sub-stages 106, 108, and 110 in the Ocular and Periocular Stages need not be the same. Rather, different operations that account of the particular features of ocular and periocular regions can be used in those respective stages. The enrollment ocular and/or periocular templates, prior to storing, can be encrypted or otherwise protected at step 112.

Periocular Boundaries

Figure 2B:
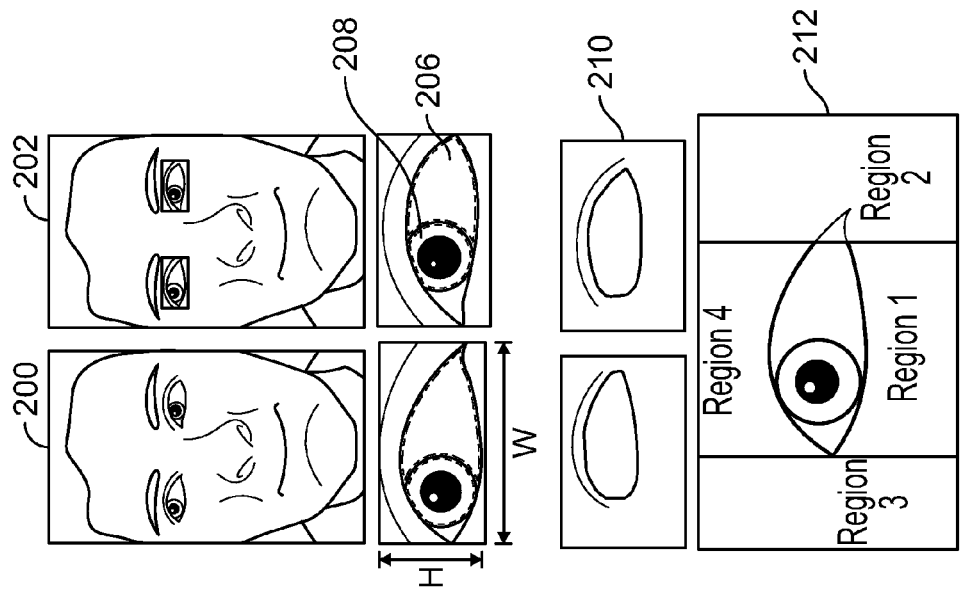
FIGS. 2A and 2B depict an example method for defining ocular and periocular regions, and corresponding facial images, according to an implementation.
Figure 2A:
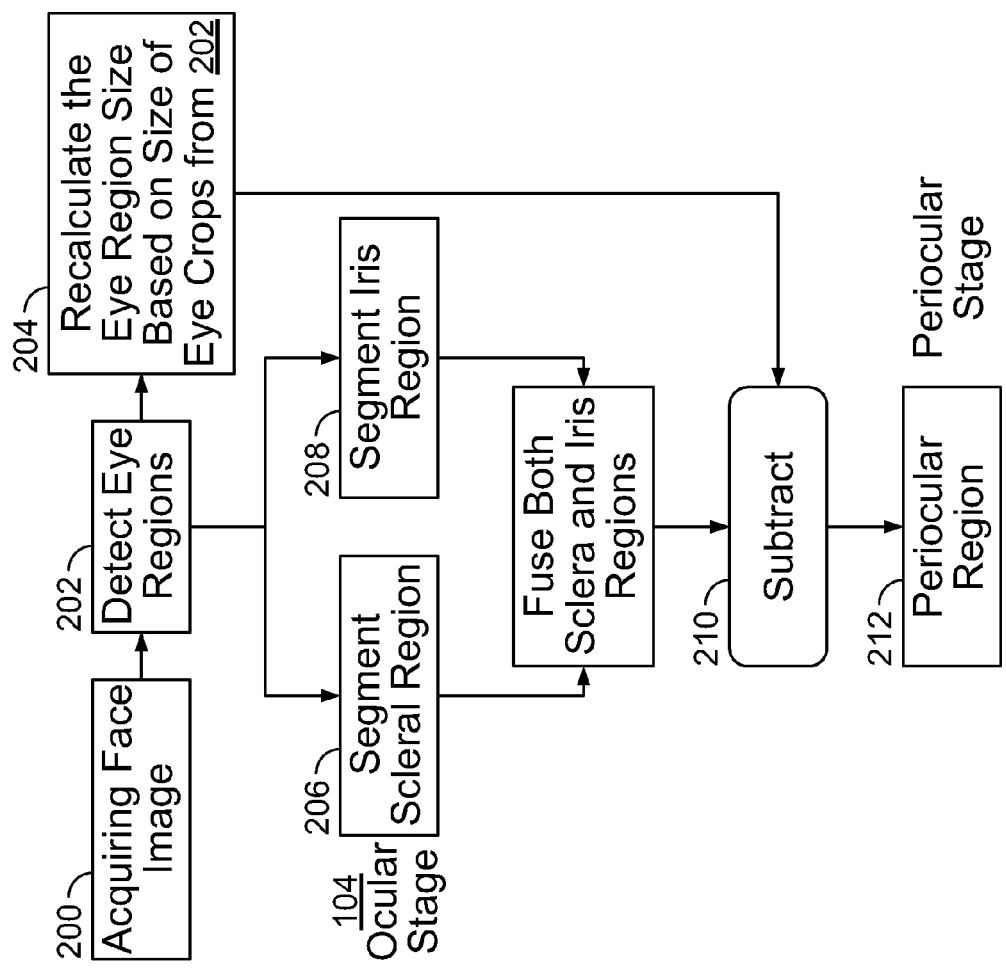

Referring now to FIGS. 2A and 2B, periocular regions can be extracted using various methods. On acquiring an image of a user's face (step 200), one or more eye regions are detected (step 202). Based on the size of eye crops identified in step 202, the eye region size can be recalculated (step 204). Proceeding to the ocular stage, in one implementation, an integro-differential algorithm, Hough circles or Hessian blob detector is used to detect the iris boundary (segmentation of iris region in step 208). Similarly, a Gabor filtering based algorithm can be used to detect the upper and lower eyelid, and further whites of the eye can be separated after removing the iris region (segmentation of scleral region in step 206). The periocular region can be derived after subtracting both white of the eye and iris regions from the captured images (Step 210). In some implementations, color-based methods are used to segment the above-mentioned regions.

In one implementation, as shown by the periocular region stage 212 in FIGS. 2A and 2B, periocular regions around the final ocular ROI of size width W×height H (where W and H are the number of pixels in the horizontal and vertical direction, respectively) can be defined as described below. The ocular ROI is not necessarily a rectangular shape; rather, the ROI can take a form similar to the shape of the eye, as shown in FIG. 2B, and the W and H can be defined as the width and height, respectively, of a bounding box encompassing the ocular ROI. There can be various numbers of regions; however, the implementation described below includes four periocular regions (1 through 4) ranked by discriminative power, which essentially refers to how useful the region is in a biometric matching operation. More specifically, periocular region 1 represents a facial region with more distinctive, or discriminatory, characteristics than region 2, which has greater discriminative power compared to region 3, and so on. Various periocular region sizes are contemplated (here, defined by a bounding box of width W×height H). The ranges and values of the periocular regions disclosed herein were experimentally determined based on large scale testing of which periocular regions have sufficient discriminative power for the purposes of performing biometric matching operations. As used below, the term "substantially equal" means equal to a particular value or within +/−10% of the value.

In one implementation, the four periocular regions are defined as follows, where W and H refer to the width and height, respectively, of the ocular region:

Region 1:
Width is substantially equal to W.
Height is in the range of 0.1*H to 3*H below the eye crop of the ocular region, inclusive. In one implementation, height is substantially equal to 0.3*H.

Region 2:
Width is in the range of 0.1*W to 0.8*W, inclusive. In one implementation, width is substantially equal to 0.2*W.
Height is in the range of 1.2*H (0.1*H above the eye crop of the ocular region and 0.1*H below the eye crop) to 5.5*H (1.5*H above the eye crop and 3*H below the eye crop), inclusive. In one implementation, height is substantially equal to 1.45*H (0.15*H above the eye crop and 0.3*H below the eye crop).

Region 3:
Width is in the range of 0.1*W to 0.5*W, inclusive. In one implementation, width is substantially equal to 0.15*W.
Height is in the range of 1.2*H (0.1*H above the eye crop of the ocular region and 0.1*H below the eye crop) to 5.5*H (1.5*H above the eye crop and 3*H below the eye crop), inclusive. In one implementation, height is substantially equal to 1.45*H (0.15*H above the eye crop and 0.3*H below the eye crop).

Region 4:
Width is substantially equal to W.
Height is in the range of 0.1*H to 1.5*H above the eye crop of the ocular region, inclusive. In one implementation, height is substantially equal to 0.15*H.

Other non-rectangular or even non-contiguous periocular (or other facial) sub-regions can be used based on the differentiability and reliability of those region(s) per individual, certain population, or all of the user(s). In some implementations, when drooping eyelids are often observed, an optimal periocular region around the tight crop of size W×H can be defined as follows:

Widths of regions 2 and 3 are substantially equal to 0.2*W and 0.15*W, respectively.
Heights of regions 2 and 3 are substantially equal to 1.45*H each (which starts from the top of the eye crop).
Widths of regions 1 and 4 are substantially equal to W.
Heights of regions 1 and 4 are substantially equal to 0.45*H and 0.1*H, respectively.

The range of values for heights and widths for various regions are same as explained above. Other periocular region sizes are contemplated. The values of W and H can vary based on imaging sensor resolution.

Image Enhancement

Image enhancement techniques, such as those performed in step 106 of FIG. 1, will now be explained. The images that are captured from an image sensor can have varying quality due to, for instance, exposure and motion blur artifacts. In step 106, which is optional, several images can be registered (i.e., spatially aligned) and averaged to reduce image noise. In some implementations, image correlation methods are used to measure the dissimilarity between the obtained images in order to align the images for averaging and discard those that are most different (e.g. due to motion blur or eye blink) and, hence, are not suitable for registration and averaging. For example, n consecutive frames with minimal motion can be averaged after registration. The number of consecutive frames (disregarding the occasional dropped frames explained above) that are averaged can depend on the frame rate, noise level of the image sensor at the given settings, environment conditions in which images are being captured.

In one example, if the ambient light is greater than 800 lumens during the images acquisition, two consecutive frames are registered and averaged. If the ambient light is in the range of 450-800 lumens, 3 consecutive frames are registered and averaged. If the ambient light is in the range of 0-450 lumens, 4 consecutive frames are registered and averaged. Other combinations of selecting the number of frames based on ambient light are possible for whites of the eye, periocular region and face, including non-averaging option if the region of interest is bright enough for the sensor noise to be negligible at the given settings.

In another implementation, the number of frames used to average can also be adapted to the motion artifacts across consecutive frames. For example, the motion may be caused due to changing expressions, eye and body movements and/or environmental aberrations. Motion can be measured using correlation across frames, mutual information across frames, etc. In one implementation, the number of frames used to average relies on both environmental lighting and observed motion artifacts.

In some implementations, image enhancements algorithms include Self Quotient Image, or SQI. A simple version of SQI image (Q) can be represented as follows:

$$Q = I/\hat{I} = I/(F*I)$$

where, $\hat{I}$ is the smoothed version of I, and F is the smoothing kernel. SQI method is known for its lighting invariance property, which is useful for periocular regions with variable illumination due to shadows and other lighting conditions. Other image enhancements such as Weber Linear Descriptors (WLD), Coherence Diffuse Filters, Atrous Wavelets, Retinex (and its variants), single or multi frame bilateral filtering, deep learning methods and other sparse enhancement can be used.

In one implementation, local gradient Gabor pattern (LGGP) can be used as an image enhancement technique for a particular image or image region, as described in the following steps.

Step 1: Calculate the phase of Gabor for the green channel of the image region using even and odd Gabor responses as follows:

Step 1a: A 2D even Gabor kernel, similar to band-pass filters, is a cosine function modulated by 2D Gaussian envelope, and 2D odd Gabor is a sinusoidal function modulated by 2D Gaussian envelope. The even and odd Gabor kernels can be derived as follows:

$$G_{even}(x, y, f, \phi) = \exp\left\{\frac{-1}{2}\left[\frac{x'^2}{\sigma_x^2} + \frac{y'^2}{\sigma_y^2}\right]\right\}\cos(2\pi f x')$$

$$G_{odd}(x, y, f, \phi) = \exp\left\{\frac{-1}{2}\left[\frac{x'^2}{\sigma_x^2} + \frac{y'^2}{\sigma_y^2}\right]\right\}\sin(2\pi f x')$$

Any scale and orientation of Gabor kernel can be achieved through the following coordinate transformation:

$$x' = x \cos(\phi) + y \sin(\phi)$$

$$y' = -x \sin(\phi) + y \cos(\phi)$$

where $\sigma_x$ and $\sigma_y$ define spread of the Gaussian envelope along x and y-axes respectively, f is the frequency of the modulating sine or cosine, and $\phi$ is orientation of the kernel. In one implementation, frequency is set to 6 and spread of Gaussian along x and y-axes is set to 2.5. In one implementation the choice of orientations is pruned to 6, ranging from 0 to $5\pi/6$, each $\pi/6$ radians apart.

Step 1b: The phase of Gabor image is calculated as follows:

$$I_{Phase}(\phi) = \tan^{-1}\left(\frac{G_{odd}(\phi) \otimes \text{Image}}{G_{even}(\phi) \otimes \text{Image}}\right)$$

where $\otimes$ is the convolution operator. At any given orientation, as an example, $I_{Phase}(\phi=0)$ is an image of size equal to the size of the green channel of the image region.

Step 2: The phase of Gabor responses (images) at various orientations are aggregated to form an output image. Three example methods for achieving this are: (1) retain the maximum value of the intensity of a pixel at a given location (x, y) across all the orientations; (2) set the intensity of a pixel at a given location (x, y) to the weighted average of responses across all the orientations at that particular location; and (3) multiply the maximum value of the intensity of a pixel at a given location (x, y) across all the orientations with the original image, followed by normalization.

Step 3: The local gradients in four directions (0, 45, 90, and 135 degrees) are then calculated for the aggregated responses and the maximum gradient value is retained to form an output image.

In one implementation, color normalization such as white balancing using a gray world algorithm can be used before the aforementioned enhancement techniques.

In one implementation, additional processing of the enhanced image includes image histogram and contrast adjustments such as Contrast Limited Adaptive Histogram Equalization (CLAHE). CLAHE generally operates in small regions of the image referred to as tiles. Typically, each tile's contrast is enhanced such that the histogram of the output approximately matches the histogram specified by a particular distribution (e.g., uniform, exponential, or Rayleigh distribution). The neighboring tiles are then combined using an interpolation (e.g. bilinear interpolation) to eliminate any artificially induced boundaries. In some implementations, selecting a linear or nonlinear combination of the red, green, or blue color components that have the best contrast between the ocular vessels or periocular features and the background can enhance the image region. For example, the green component can be preferred in a RGB image of the ocular-vascular, because it can provide a better contrast between vessels and the background.

Image and Feature Quality Metrics

Referring back to step 108 in FIG. 1, the quality of each enhanced image can be measured, and those that meet a certain quality threshold are retained for further processing. Such quality can be measured jointly or separately for the ocular and periocular region. An image quality metric can also act as a match-predictive quality metric (measure of the respective biometric sample's ability to match) and, in some scenarios, can be fused into a final match score to improve biometric system performance.

In one implementation, detected interest points in an image can determine the quality of the image. One point based quality metric, which is a no-reference image quality metric, will be referred to herein as EV_QM. EV_QM can be calculated using three steps: Interest Point Detection, Region Value Calculation, and Quality Metric Score Generation. Interest points can be detected using vascular point detection (VPD), explained further below. Region value refers to the amount of texture around each interest point. The texture around each interest point can be determined using Local Ternary Pattern (LTP). Quality metric score generation is measured using corner location and region value.

Figure 3:
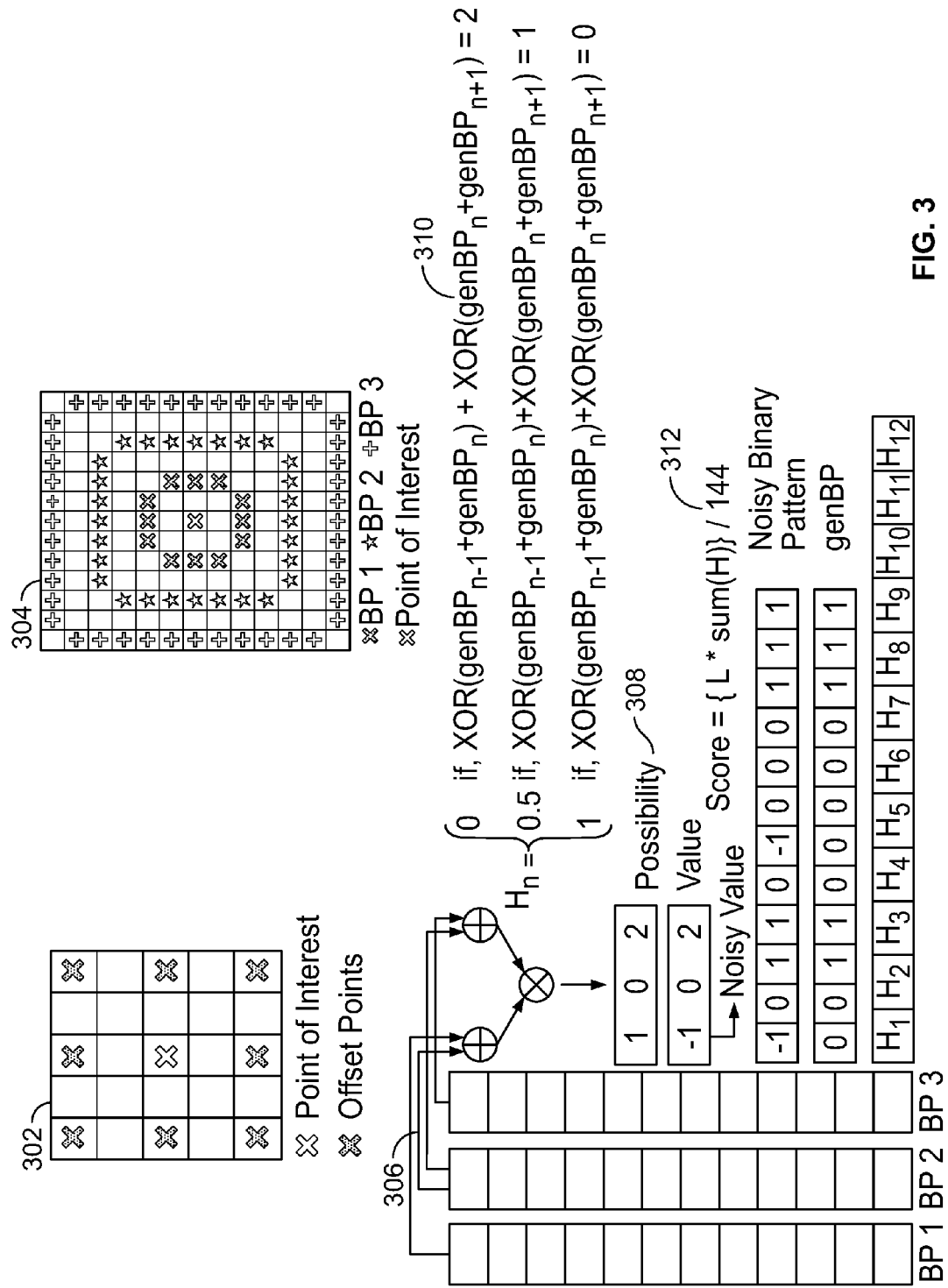
FIG. 3 depicts an example modified local binary pattern (genBP) process, according to an implementation.
Figure 4:
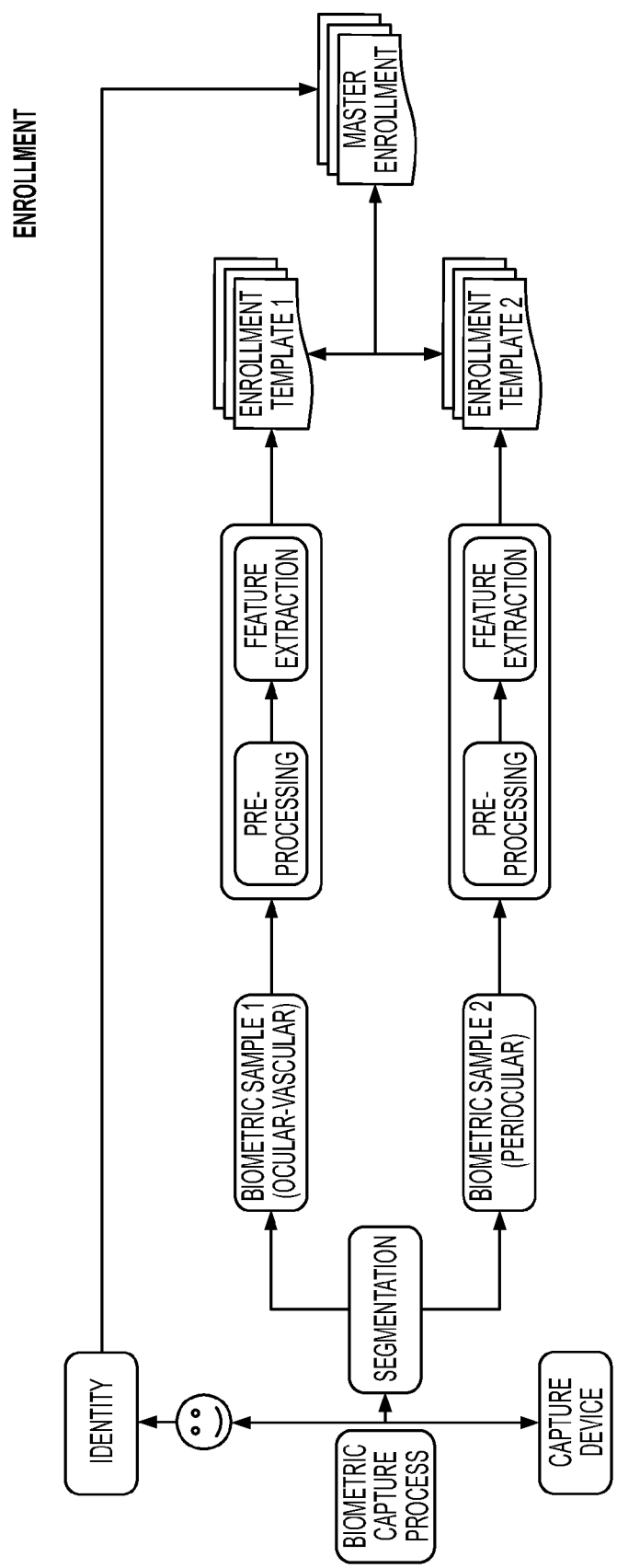
FIG. 4 depicts an example technique for biometric progressive matching with enrollment and verification phases, according to an implementation.
Figure 4:
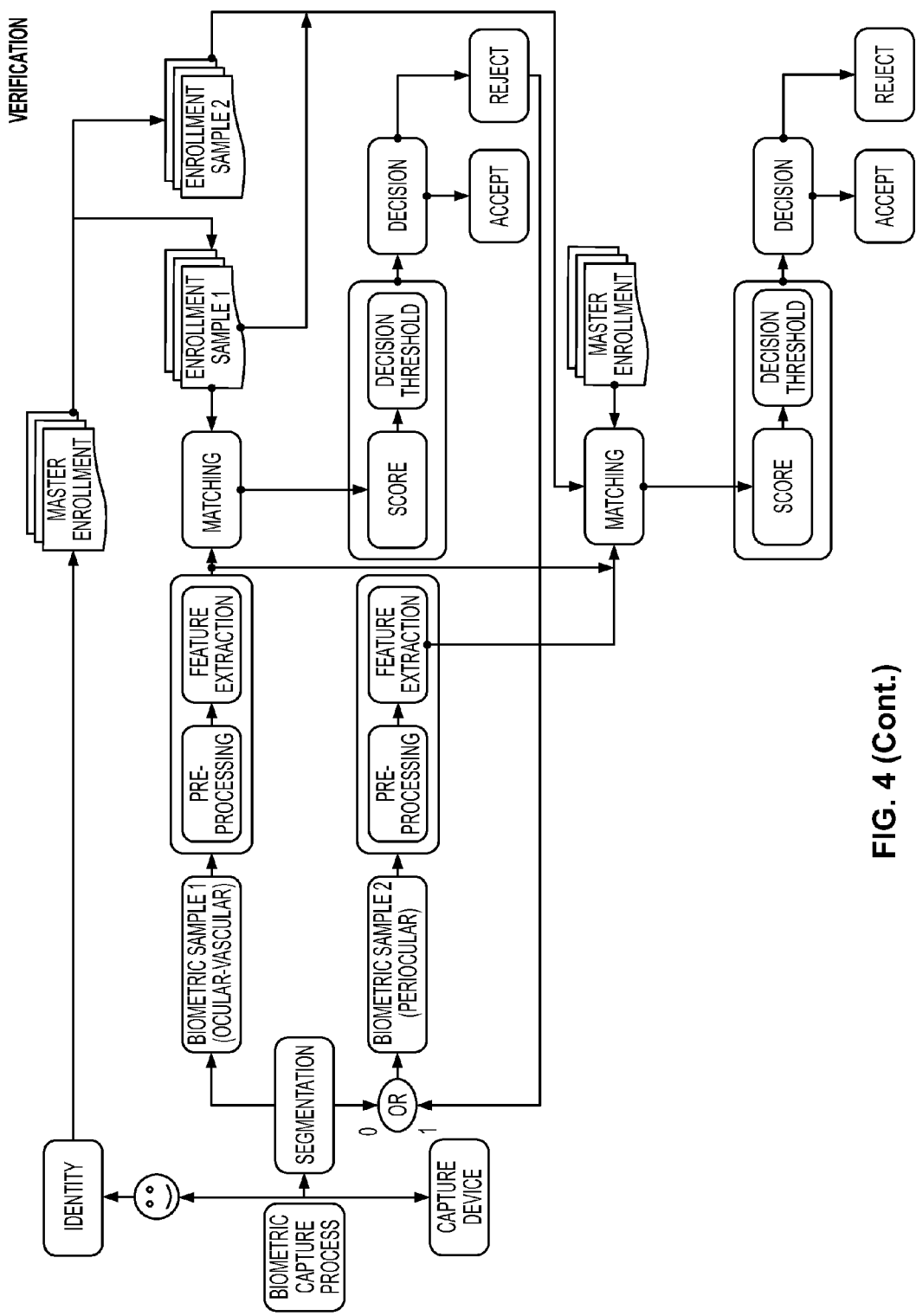

Referring to FIG. 3, in one implementation, region value can be calculated using the following modified local binary pattern (LBP) process. Three squares (with or without corners) with corresponding different half-lengths (neighborhoods) are calculated around an interest point, with their pixel loci computed (as depicted in pixel grid 304). For example, these half-lengths can be 2, 4, 6, or other number of pixels. The interest point can be further offset (shifted) in 8 different locations (as depicted in pixel grid 302), further creating 3 squares (minus their corners) around each offset point (similar to that depicted in pixel grid 304, with the offset point serving as the center point). LBP for each interest and offset points are calculated across each of the three squares, which are further referred to as Binary Patterns (BP). Thus, each interest point and corresponding offset points have three different BPs associated with them.

The three BPs can be further reduced to obtain a final region value (texture score) as follows:

Step 1: Each BP is evaluated to determine the uniformity score. If the BP is not uniform (e.g., more than 4 bits change or fewer than 2 bits change), then the BP is discarded and the score (final region value) across the corresponding offset or interest point is set to zero.

Step 2: If all of the BPs are uniform, a filtering process, as graphically depicted in step 306 of FIG. 3 is performed. Each element in BP1, BP2, and BP3 is added using the following formula:

$$\text{Result}_n = \text{XOR}(BP1_n, BP2_n) + \text{XOR}(BP2_n, BP3_n)$$

There are three possible values (1, 0, and 2) that can be seen in each element of $\text{Result}_n$. Each of these bits is further mapped according to the corresponding values (−1, 0, and 1, respectively) in Value, as shown in step 308. This result is further referred to as Noisy Binary Pattern (NBP)

Step 3: If there are more than four noisy pixels, the score for the corresponding interest point is set to zero. Otherwise, each noisy pixel in the NBP is replaced with its closest neighbor.

Step 4: The final result is a single binary pattern with length of BP for half-length 2. This final binary pattern is further referred to as genBP.

Step 5: genBP is further weighted based on formulae described in step 310:

$$H = \begin{cases} 0 & \text{if } XOR(genBP_{n-1} + genBP_n) + XOR(genBP_n + genBP_{n+1}) = 2 \\ 0.5 & \text{if } XOR(genBP_{n-1} + genBP_n) + XOR(genBP_n + genBP_{n+1}) = 1 \\ 1 & \text{if } XOR(genBP_{n-1} + genBP_n) + XOR(genBP_n + genBP_{n+1}) = 0 \end{cases}$$

The result is further referred to as weighed pattern, or H.

Step 6: Calculate the maximum length of continuous zeros in genBP and let it further be referred to as L.

Step 7: The final region value $s_n$ can be calculated using the formula described in step 312:

$$s_n = \frac{\{L * \text{sum}(H)\}}{144}$$

Step 8: If at least three of the points including the interest point and corresponding offset points compute a region value, the region values of the interest point and those offset corresponding points computing a region value are averaged and assigned to $s_n$. Otherwise, $s_n$ is set to zero.

In another implementation, region value can be calculated using entropy of the region surrounding the interest points and the corresponding offset points around each interest point. The entropy of the region around interest point is calculated as follows:

Step 1: Initialize a threshold to quantize the texture in the region of interest around the interest point and corresponding offset points.

Step 2: Determine the number of levels (level_map) in the region of interest by subtracting the center pixel intensity with all the other intensities in the region of interest.

Step 3: level_map is further quantized by grouping the pixel intensities using the threshold determined in Step 1.

Step 4: The number of unique elements in each group of level_map is calculated.

Step 5: The value of the region based on entropy around an interest point is calculated as follows:

$$\text{Entropy(Region Value, } s_n) = \sum_i N_i * \log(1/N_i)$$

where N is the length of elements in group 'i'.

Step 6: Average $s_n$ across the interest point and corresponding offset points, and assign the averaged value to $s_n$.

In another implementation, region value can be calculated using the entropy of gradient information around the interest points in 'D' directions. In one implementation, D includes 0, 45, 90, and 135 degrees. The gradient information can be calculated in multiple scales around an interest point.

In one implementation, corner locations and corresponding region values can be used to determine the quality metric score generation. Quality metric score generation can be implemented as follows:

Step 1: Sort the interest points based on their region values in descending order and note the corresponding interest point locations.

Step 2: Let the distances between corresponding interest points after rearranging them based on Step 1 be $d=\{d_1, d_2, d_3, \ldots, d_{n-2}, d_{n-1}, d_n\}$, where d1 is the distance between the first and second interest point. $d_n$ will be zero.

Step 3: Let the weights of the distances be computed as the logarithm of distances: $dw_n=\log(d)$.

Step 4: Compute the weighted index as:

$$sw_n = \exp^{(1/[1,2,3,\ldots,n-2,n-1,n])},$$

where n is the number of interest points

The final quality metric score can be computed using the following formula:

$$EV\_QM = \Sigma_{n=1}^{p} s_n * sw_n * dw_n,$$

where p is the number of interest points

Other interest point detection algorithms can be used, such as can be calculated using Accelerated Segment Test (FAST) or Speeded Up Robust Features (SURF) algorithms.

EV_QM can be calculated separately for ocular and periocular regions, and further, each ROI can be ranked based on calculated EV_QM. The ROIs can be matched in the order they were ranked if a progressive matcher (described below) is being used. Of note, the quality metrics described herein can be used in spoof detection techniques. Reproductions of facial features of an eye or face, such as a physical photographs or printouts, or digital images or videos of the genuine user played back on a screen for malicious intent, are often of reduced quality (e.g., lower resolution, fuzzy, discolored, noisy, blurred, etc.) compared to a real physical presence at the time of scan. After filtering out low quality points of interest during the verification process, a low quality reproduction generally will not have a sufficient number of recognizable points of interest and, therefore, will fail verification.

Similar techniques can be used to detect partial spoofs as well. For example, a person may hold a printout of a valid eye over his or her own eye in an attempt to pass the eye verification process. In performing verification, the determined quality of the eye printout (e.g., the recognizable points of interest) can be compared to the determined quality of periocular or other facial regions. If the difference in quality between the eye and one or more other regions exceeds a threshold, this may indicate the presence of a partial spoof, and the verification can fail. Other spoof detection techniques using the disclosed quality metrics are contemplated.

Interest Point Detection

Various interest point detection algorithms can be used within a captured image region of ocular-vascular, periocular, and face, separately. For example, the Speeded Up Robust Features (SURF) algorithm is a "blob" type feature detection algorithm that can be used to identify areas within an image region centered on an interest point. The Features from Accelerated Segment Test (FAST) algorithm is a corner detection algorithm that can also be used to identify interest points within an image region. The vascular point detector (VPD) can also be used to identify the points that latch on the vasculature within an image region. Further, VPD can also be used to detect points on the periocular region and face. In some implementations, candidate points can also be identified at multiple image scales. For example, if the original image size is 100×100 (Scale 0), points can be identified from the 100×100 original image and also when the original image is resized to 50×50 (Scale 1) and 25×25 (Scale 2). Other region specific configurations of point detectors can be considered.

Point Suppression

The number of candidate points that are produced using an interest point detection algorithm can vary based on the amount of texture and quality of the image. Moreover, such algorithms may latch onto noisy or irrelevant (with respect to the given application) information, especially with non-VPD algorithms. Such noisy or irrelevant candidate points can be removed by a candidate point suppression algorithms.

In one implementation, a non-vascular point suppression (NVS) algorithm is used to determine the candidate point quality. The algorithm is explained in the following steps:

Step 1: Extract a Region (R) around an interest point. Let the size of R be M×M.

Step 2: Extract Local Patches (LP) within R of size N×N, where N<M. Assign the LP centered in R as Center Patch (CP).

Step 3: Local patches inside the region R are sparsely populated.

Step 4: Calculate the histogram distributions of all LPs enclosed in region R, and subtract the histogram of CP from each calculated histogram for LPs.

Step 5: For each subtraction, calculate the spread score as the number of bins being occupied divided by the total available bins.

Step 6: Derive a combination of bandpass filters based on the distribution of pixels in original image (Band Pass Filter Computation). These bandpass filters are used to measure the amount of spurious pixels such as glare against the vascular information pixels.

Step 7: Subtracted patches from Step 4 are filtered based on the derived band pass filter, and a corner response is calculated.

Step 8: Use spread score and corner response in cascade framework. Spread score is a binary classifier: it either rejects or accepts the point. Corner response provides a normalized scored between zero and one. Zero indicates non-vascularity while one indicates vascularity.

In another implementation, a Bandpass Filter Computation is used to determine the candidate point strength. The bandpass filter is dynamically generated based on the segmented whites of the eye region statistics. The bandpass filter can be generated as follows:

Step 1: Extract the green layer of the scleral region from an RGB image.

Step 2: Derive a histogram of the region. For example, use 'N' bins to extract a histogram from an uint8 image.

Step 3: Calculate the exponential of inverse normalized histogram derived in Step 2.

Step 4: Suppress the exponential by a factor k. Factor k generally varies from 0.1 to 0.3 and can be tuned based on the application or dataset.

Step 5: Calculate the response of inverse exponential with integer values ranging from 1 to N.

Step 6: Concatenate the first 5 elements from Step 4 and remaining from Step 5. This provides Bandpass Filter 1.

Step 7: For Bandpass Filter 2, construct a Gaussian with normal distribution of scleral pixels (green channel).

Step 8: Use Bandpass Filter 1 and Bandpass Filter 2 in parallel to establish the strength of the vascular point.

This filter construction process is adaptive to image pixels. If the image is dark, most of the scleral pixels fall near the lower tail of the histogram. So, Bandpass Filter 1 would have a higher response over Bandpass Filter 2. This reduces the score of the point. Similarly, a glare-saturated image would have all its pixels in the upper tail and Bandpass Filter 2 will have a higher response, eliminating the point with a low score.

In one implementation, the uniformity of the Local Binary Pattern (LBP) can be generated to determine the quality of a candidate point. Using the 8-bit LBP code, the number of bitwise transitions from 0 to 1 or vice-versa determines uniformity of the LBP code. A LBP code is considered uniform, if it has less than or equal to 'n' transitions. The range of transitions is 0 to 8. In one implementation, n is equal to 3. As an example, the LBP codes 00000000 with 0 transitions, 01111100 with 2 transitions, 01000001 with 3 transitions, are uniform. Similarly, 01010000 with 4 transitions and 01010010 with 6 transitions are non-uniform. The candidate points that are uniform are retained in the template.

The above mentioned quality algorithms for candidate points can be used in combination or separately for a given enrollment or verification process.

Local Feature Descriptors

A feature vector around each interest point can be generated using an image patch around the interest point for the ocular-vascular, periocular, and face regions, separately. The descriptors for an interest point can be generated using a single or multiple feature descriptor algorithms. The Fast Retina Keypoint (FREAK) algorithm is one example feature descriptor algorithm that can be used, for example, to generate descriptors for candidate points identified by the FAST algorithms. A FREAK descriptor can be, for example, a string of binary numbers that defines visual features surrounding a candidate point. Local Binary Patterns (LBP) and their variants such as Center Symmetric Local Binary Patterns (CSLBP) around the candidate points are examples of feature descriptors that can be used to describe image patches in a vicinity of a candidate point. Histograms of oriented Gradients (HoG), Histograms of LBP (HLBP), Histograms of CSLBP (HCSLBP), Patterned Histograms of Extended Multi-Radii LBP (PH-EMR-LBP), Patterned Histograms of Extended Multi-Radii CSLBP (PH-EMR-CSLBP), Patterned Histograms of Extended Multi-Radii Local Ternary Patterns (PH-EMR-LTP), and Patterned Histograms of Binary Patterns after Dimensionality Reduction (PHBP-DR) are other examples of feature descriptors that can be used to describe image neighborhoods around candidate points. Other feature descriptor algorithms or combinations of algorithms can be used to generate local image descriptors for candidate points of an image region.

In one implementation, the following steps are involved in generating PH-EMR-LBP descriptors:

Step 1: Calculate both LBP codes for 3×3 pixel and 5×5 pixel concentric squares around each pixel to form a multi-radii LBP (MR-LBP) image (note that, in contrast to regular LBP, the aforesaid technique uses a square or rectangular neighborhood, which can include or exclude corners) rather than a circular loci of pixels around the center pixel for LBP code derivation). In a 3×3 pixel region, comparing the center pixel with its immediate eight neighboring pixels generates a 3×3 LBP code. The result is an 8-bit code, whose bit values are either 0 or 1 (1 if the intensity value of the neighbor pixel is greater than the intensity of the center pixel, else 0). Similarly, in a 5×5 pixel region, comparing the center pixel with its next to immediate eight neighboring pixels (that is, sixteen pixels) generates a 5×5 LBP code (results is a 16-bit code). Hence, a MR-LBP has a 24-bit code (8 from 3×3, and 16 from 5×5 LBP code) for a given pixel in an image.

Step 2: An M×M patch (output of step 1) around each interest point is segmented into N×N sub-regions that can have K overlapped pixels.

Step 3: The histograms for each 24-bit MR-LBP within each sub-region are derived separately, and concatenated to deliver PH-EMR-LBP (note that in contrast to regular LBP, this histogram is calculated based on the frequency of LBP bit locations in the patch, rather than that of the decimal equivalent of the binary code).

The parameter values for M, N and K can be tuned based on the images' spatial frequency, resolution, and noise.

In one implementation, the following steps are involved in generating PH-EMR-CSLBP descriptors:

Step 1: Calculate both 3×3 pixel and 5×5 pixel center symmetric local binary patterns (CSLBP) codes at each pixel to form a multi-radii CS-LBP (MR-CSLBP) image. In a 3×3 region, comparing the intensity values of the diagonal pixels using the 8 boundary pixels generates a 4-bit 3×3 CS-LBP code (starting from the top-left pixel, consider the boundary pixels as numbered from 1-8 in a clock-wise direction, the 4-bit CS-LBP code is generated by comparing pixel 1, 2, 3, and 4 with 5, 6, 7, and 8 respectively). The values are 0 or 1 (1 if the intensity value of 1 is greater than 5, else 0—similarly, for other combinations). Likewise, in a 5×5 region, the 16 diagonal pixels of the outer ring are compared to generate an 8-bit 5×5 CS-LBP code. Hence, a MR-CS-LBP has a 12-bit code (4 from 3×3, and 8 from 5×5 CS-LBP code) for a given pixel in an image.

Step 2: An M×M patch (output of step 1) around each interest point is segmented into N×N sub-regions that may have K overlapped pixels.

Step 3: The histograms for each 12-bit MR-CS-LBP within each sub-region are derived separately, and concatenated to deliver PH-EMR-CS-LBP.

Similar to the previous descriptor, the parameter values for M, N and K can be tuned based on the images' spatial frequency, resolution, and noise.

In one implementation, the following steps are involved in generating PH-EMR-LTP descriptors:

Step 1: Calculate both 3×3 pixel and 5×5 pixel local ternary patterns codes at each pixel to form a multi-radii LTP (MR-LTP) image with a Step Size (SS). In a 3×3 region, comparing the center pixel with its immediate eight neighboring pixels generates a 3×3 LTP code. The result is a 16-bit code, whose values are 0 or 1 (1 if the intensity value of each neighbor pixel is greater than the intensity of the center pixel plus SS, else 0; and 1 if the intensity value of each neighbor pixel is less than the intensity of the center pixel minus SS, else 0). Similarly, in a 5×5 region, comparing the center pixel with its next to immediate eight neighboring pixels (that is 16 pixels) generates a 5×5 LTP code (result is a 32-bit code). Hence, a MR-LTP has a 48-bit code (16 from 3×3, and 32 from 5×5 LBP code) for a given pixel in an image.

Step 2: An M×M patch (output of step 1) around each interest point is segmented into N×N sub-regions that may have K overlapped pixels.

Step 3: The histograms for each 48-bit MR-LTP within each sub-region are derived separately, and concatenated to deliver PH-EMR-LTP.

Similar to the previous descriptor, the parameter values for M, N and K can be tuned based on the images' spatial frequency, resolution, and noise.

In one implementation, a PHBP-DR can be derived using the following steps:

Step 1: PH-EMR-LBP for a given interest point is derived by setting the M, N and K values to 9, 3 and 1 respectively. These configurations deliver a feature vector of length 384 (24×16; histograms of each of the 24-bit codes across 16 sub-regions. Note that 16 3×3 sub-regions are possible in a 9×9 patch with 1 pixel overlap) with values ranging from 0 to 9 (as we have 9 pixels in 3×3 sub-region).

Step 2: PH-EMR-CS-LBP for a given interest point is derived by setting the M, N and K values to 7, 3 and 1 respectively. These configurations deliver a feature vector of length 108 (12×9; histograms of each of the 12-bit codes across 9 sub-regions. Note that 9 3×3 sub-regions are possible in a 7×7 patch with 1 pixel overlap) with values ranging from 0 to 9 (as we have 9 pixels in 3×3 sub-region).

Step 3: PH-EMR-LTP PH-EMR-LBP for a given interest point is derived by setting the M, N and K values to 9, 3 and 1 respectively. These configurations deliver a feature vector of length 768 (48×16; histograms of each of the 48-bit codes across 16 sub-regions. Note that 16 3×3 sub-regions are possible in a 9×9 patch with 1 pixel overlap) with values ranging from 0 to 9 (as we have 9 pixels in 3×3 sub-region). SS is set to 5 after the intensity values of the image are normalized to 0-255.

Step 4: Feature vectors 1, 2, and 3 are concatenated to form a feature vector of length 1260.

Step 5: Using a variance analysis, only the top 720 features are retained. In some instances, as these highly variant features are pre-calculated, only these 720 features are generated during enrollment and verification process in the interest of reducing computational complexity.

Step 6: Finally, a dimensionality reduction method such as principal component analysis (PCA) is used to extract PHBP-DR. A separate PCA analysis can be performed for ocular and periocular regions to produce 103 and 98 long feature vectors, respectively. For face, either periocular features can be used as is, or a separate PCA analysis can be performed. Other lengths of feature vectors for ocular, periocular and face are possible.

At the end of the biometric enrollment process, an enrollment template can include a set of candidate points and the descriptors for ocular-vascular ROI, and a set of candidate points and the descriptors for a periocular region. In some implementations, an enrollment template can also include a set of candidate points and the descriptors for a face, and/or a set of candidate points and the descriptors for extended periocular regions. Note that the ocular-vascular and periocular ROI and template for left and right eyes are treated separately. Multiple descriptors for a set of interest points are contemplated. Original and processed images that are used to produce templates for ocular-vascular face, and periocular region can be discarded for security and privacy reasons.

Progressive Matcher

In one implementation of a biometric matching process, a final match score is generated using a progressive matcher. As an initial step, local image descriptors are matched to find Matched-Point-Pairs between enrollment and verification templates for both ocular and periocular regions using a distance measure. As an example, a Euclidean distance between descriptors of interest points can be calculated between the enrollment and verification descriptor vectors of ocular and periocular regions separately, and the pairs below a certain distance threshold can be retained as Matched-Point-Pairs.

In presence of noise or other aberrations, the Matched-Point-Pairs may have several outliers or otherwise erroneous extra matches. By assuming a plausible homography between the locations of Matched-Point-Pairs enrollment and verification images, outliers (spatially non-overlapping matched points after alignment under the assumed homography) can be removed from Matched-Point-Pairs.

In some implementations, a random sample consensus (RANSAC) or other outlier detection method can be used to determine the transformation needed to align candidate points in a verification image with points in an enrollment image, while rejecting outliers that do not fit a hypothesized transformation between genuine matches, in terms of geometries of ocular regions of interest encoded in enrollment and verification templates. In some implementations, the RANSACs of different ROIs (such as ocular-vascular and periocular ROIs) can be performed separately, and the collection of the surviving inlier points can be delivered to a final RANSAC for final score calculations and other related computations. In some implementations, a minimum number of inlier points from certain or all sub-regions of interest (e.g., vascular patches and points seen on top of the scleral ROI) can be required before proceeding to final matching. Eventually, the score is generated by combining the number of inliers that are found after RANSAC (N), recovered scale from the transformation matrix (RS), and recovered angle from the transformation matrix (RA), using the homography fitted to the locations of Matched-Point-Pairs by RANSAC or equivalent.

In one implementation, the match score is calculated using the following formula:

$$MS=\{(Cx+Cy)/2*\log(N)\}/\{(1+|\log 2(RS+0.001)|)*(1+(RA/0.2)^2)\}$$

where Cx and Cy are correlations between vectors of x and y coordinates of inlier matched points between enrollment and verification templates, respectively, N is the number of these aligned points, RA is the recovered angle which represents the change in angle resulting from the transformation of the locations of inlier matched verification points to the enrollment points for registration, and RS is the recovered scale which represents the change in scale resulting from the aforesaid transformation. RA and RS are derived from the similarity or alike geometric transformation matrix resulting from RANSAC or similar operation. Other measures such as the distance of the transformation/registration matrix from identity are contemplated, especially if the regions of interest (such as the ocular-vascular and periocular) are spatially pre-normalized.

In some implementations, M-SAC, Group-SAC and/or Optimal-RANSAC can replace RANSAC.

The match scores can be generated for both whites of the eye (SV) and the periocular region (SP) separately, combined (SVP), or in a sequential manner. In the progressive approach, different ROIs are progressively included into the matcher if there is insufficient information or quality for a robust decision in the starting region of interest. For instance, if certain source quality or a definite decision cannot be achieved using the vascular information in the whites of the eye, the matcher can progressively add more information from locations pertaining to periocular (and potentially beyond, like nose and face) as needed to achieve the desired certainty in asserting a biometric match.

In one implementation, the Matched-Point-Pairs from ocular and periocular regions are calculated separately and then combined for RANSAC to generate the final match score.

In another implementation, the Matched-Point-Pairs from ocular and periocular regions are calculated separately and then combined for RANSAC to generate the final match score. However, the final inliers generation is constrained to have at-least N points from the ocular region.

In a further implementation, the Matched-Point-Pairs from ocular and periocular regions are calculated separately, their respective inliers are discovered by ROI-specific RANSACs separately, and then the collection of region-specific RANSAC-filtered template elements are combined for a final RANSAC to generate the final match score. However, the final inliers generation is constrained to have at-least N points from the RANSAC of the ocular-vascular region. In some implementations, a typical minimum value for N is 3.

In some implementations, a progressive matcher is implemented to make the final decision based on comparison of match scores against thresholds. By way of example:

Step 1: If SV >3.2, the user is authenticated, and steps 2 and 3 are skipped.
Step 2: If SVP >3.4, the user is authenticated, and step 3 is skipped.
Step 3: If SP >3.2, the user is authenticated.
End process.

In the event that the above progressive process does not authenticate the user, another enrollment template from the enrollment bank can be recalled, or a new verification image can be acquired, until a certain exit condition (such as a time limit) is reached. Other combinations of the SV, SVP and SP thresholds are contemplated. If one or more of the regions of interests is not available for scanning due to aberrations resulting from, for example, eyeglasses or glare artifacts, the systems can use other available regions.

Figure 5:
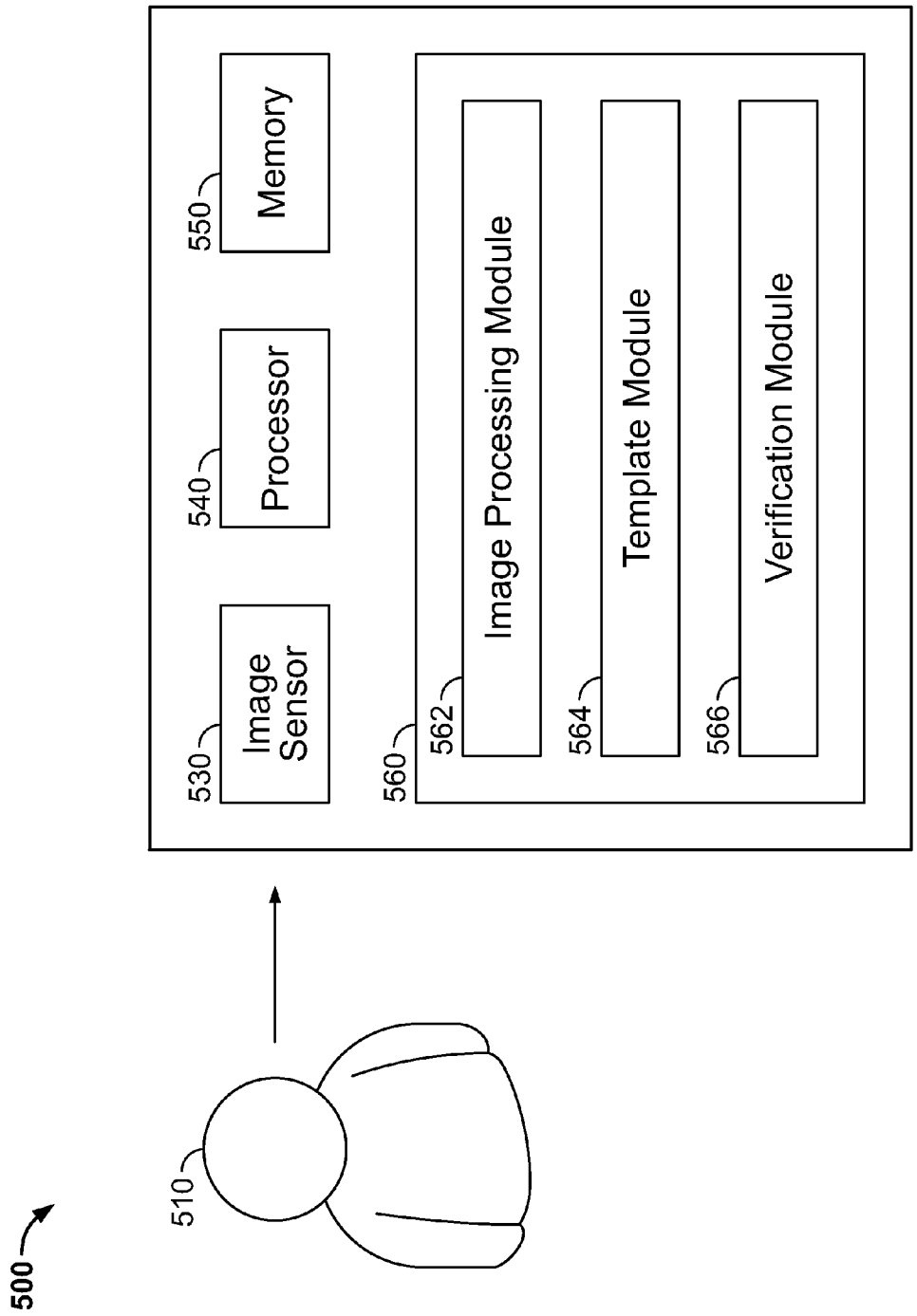
FIG. 5 depicts an example system for performing biometric scanning and analysis, according to an implementation.

FIG. 5 depicts one implementation of a method for biometric enrollment and authentication using progressive matching, including an enrollment phase in which enrollment templates are created based on ocular-vascular and periocular regions, and a verification phase in which progressive matching can be performed based on captured images and the enrollment templates. The steps illustrated in FIG. 5 can be performed in accordance with the various techniques described herein.

In some cases, a single biometric trait can be divided into multiple ROIs, which are then matched progressively. For example, significant regions of a periocular region can be divided into n parts that are then matched progressively.

In one implementation, the quality of some or all periocular ROIs can be measured and ranked, and the matching process can progressively add each ROI based on its respective rank as needed to achieve the desired certainty in asserting a biometric match.

In another implementation, an image-based distance metric or similar detects user poses, lighting conditions, or facial gestures that might distort some biometric regions of interest such as periocular. These variations can be induced during enrollment or added to a rolling template bank based on a template update policy. At the time of verification, the matcher can try to retrieve the most relevant templates from the bank based on the aforementioned image similarity metric.

In another implementation, if the matching process encounters a new pose or facial expression, the closest expression is used and a special case of progressive matcher is applied. For example, a special case can divide the periocular region into several segments using a clustering process, and within each segment the score and transformation matrix are generated. The final score can be determined by a weighted fusion of all the individual segment scores. These weights are determined by the amount of deformation observed across all the transformation matrices. Other score fusions are possible.

FIG. 5 illustrates one implementation of a localized system for generating secure biometric templates and performing user verification according to the techniques described herein. A user device 500 can include an image sensor 530, processor 540, memory 550, biometric hardware and/or software 560, and a system bus that couples various system components, including the memory 550 to the processor 540. User device 500 can include, but is not limited to, a smart phone, smart watch, smart glasses, tablet computer, portable computer, television, gaming device, music player, mobile telephone, laptop, palmtop, smart or dumb terminal, network computer, personal digital assistant, wireless device, information appliance, workstation, minicomputer, mainframe computer, or other computing device that is operated as a general purpose computer or a special purpose hardware device that can execute the functionality described herein.

Biometric hardware and/or software 560 includes an image processing module 562 for performing operations on images captured by image sensor 530. For example, image processing module 562 can perform segmentation and enhancement on images of the eye and surrounding facial area of a user 510 to assist in isolating vascular structures and other features of interest. Template module 564 creates biometric templates based on the vasculature imagery and can performs various obfuscating and scrambling operations on the templates. Verification module 566 validates the identity of a user 510 by performing matching operations between a biometric verification template formed upon capturing a biometric reading and a previously stored enrollment template. In some implementations, certain functionality can be performed on devices other than user device 500. For example, a user device can instead include only a biometric sensor, such as a camera, and image processing and verification functions can be performed on a remote server accessible to user device 500 over a network, such as the internet.

More generally, the systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and can interact through a communication network. The relationship of client and server arises by virtue of computer programs running on the respective computers and having a client-server relationship to each other. A number of embodiments have been described. Nevertheless, it will be understood that various modifications may be made without departing from the spirit and scope of the invention.

Implementations of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and can interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementations. Conversely, various features that are described in the context of a single implementations can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
    receiving an image of a facial region of a user, the facial region including an eye and an area surrounding the eye;
    defining an ocular image region including at least a portion of the eye in the image of the facial region;
    defining one or more periocular image regions each including at least a portion of the area surrounding the eye in the image of the facial region;
    ranking the periocular image regions based on respective quality metrics separately calculated for each of the periocular image regions;
    identifying a plurality of points of interest in at least one of the ocular image region and the one or more periocular image regions;
    calculating, for each point of interest, a region value for texture surrounding the point of interest; and
    determining at least one quality metric for at least a portion of the image of the facial region based on the points of interest and the respective calculated region values.

2. The method of claim 1, wherein calculating the region value for a particular point of interest comprises:
    calculating at least one local binary pattern in a square-shaped neighborhood (BP) for the particular point of interest; and
    calculating at least one BP for one or more points offset from the particular point of interest.

3. The method of claim 2, wherein calculating the region value for the particular point of interest further comprises setting the region value to an average of region values calculated for the particular point of interest and a plurality of the offset points.

4. The method of claim 2, wherein calculating at least one BP for the particular point of interest comprises calculating a plurality of BPs, each having a different neighborhood, for the particular point of interest, and wherein calculating at least one BP for the offset points comprises calculating a plurality of BPs, each having a different neighborhood, for each offset point.

5. The method of claim 4, wherein calculating the plurality of BPs for a particular point of interest or offset point comprises:
    reducing the plurality of BPs to a Noisy Binary Pattern (NBP); and
    creating a general binary pattern (genBP) from the NBP.

6. The method of claim 5, wherein calculating the plurality of BPs for a particular point of interest or offset point further comprises:
    creating a weighted pattern H from the genBP; and
    calculating a region value for the particular point of interest or offset point as:

$$\frac{(L * \sum H)}{144}$$

where L comprises a maximum length of continuous zeros in the genBP.

7. The method of claim 2, wherein the offset points comprise a plurality of pixel locations uniformly shifted in different directions from the particular point of interest.

8. The method of claim 1, wherein determining the quality metric comprises:
    creating an ordered list of the points of interest based on respective region values of the points of interest; and
    calculating distances between consecutive points of interest in the ordered list.

9. The method of claim 8, wherein determining the quality metric further comprises calculating the quality metric as:

$$\sum_{n=1}^{p} s_n * sw_n * dw_n$$

where p comprises the number of points of interest, $s_n$ comprises the region value calculated for point of interest n, $sw_n$ comprises a weighted index for point of interest n, and $dw_n$ comprises a weight for the distance corresponding to point n in the ordered list.

10. The method of claim 1, wherein the at least a portion of the image of the facial region comprises the ocular region or at least one of the periocular regions.

11. The method of claim 1, further comprising ranking the periocular image regions based on at least one of a respective discriminative power of each periocular image region.

12. The method of claim 11, further comprising using the periocular image regions in a progressive biometric matcher based at least in part on the respective quality metric and/or discriminative power rankings of the periocular image regions.

13. The method of claim 1, further comprising:
determining that a difference in calculated quality metrics between a first one of the ocular or periocular image regions and a second one of the ocular or periocular image regions exceeds a threshold; and
indicating a likely presence of a spoof based on the determined difference in calculated quality metrics.

14. A system comprising:
at least one memory for storing computer-executable instructions; and
at least one processing unit for executing the instructions stored on the at least one memory, wherein execution of the instructions programs the at least one processing unit to perform operations comprising:
receiving an image of a facial region of a user, the facial region including an eye and an area surrounding the eye;
defining an ocular image region including at least a portion of the eye in the image of the facial region;
defining one or more periocular image regions each including at least a portion of the area surrounding the eye in the image of the facial region;
ranking the periocular image regions based on respective quality metrics separately calculated for each of the periocular image regions;
identifying a plurality of points of interest in at least one of the ocular image region and the one or more periocular image regions;
calculating, for each point of interest, a region value for texture surrounding the point of interest; and
determining at least one quality metric for at least a portion of the image of the facial region based on the points of interest and the respective calculated region values.

15. The system of claim 14, wherein calculating the region value for a particular point of interest comprises:
calculating at least one local binary pattern in a square-shaped neighborhood (BP) for the particular point of interest; and
calculating at least one BP for one or more points offset from the particular point of interest.

16. The system of claim 15, wherein calculating the region value for the particular point of interest further comprises setting the region value to an average of region values calculated for the particular point of interest and a plurality of the offset points.

17. The system of claim 15, wherein calculating at least one BP for the particular point of interest comprises calculating a plurality of BPs, each having a different neighborhood, for the particular point of interest, and wherein calculating at least one BP for the offset points comprises calculating a plurality of BPs, each having a different neighborhood, for each offset point.

18. The system of claim 17, wherein calculating the plurality of BPs for a particular point of interest or offset point comprises:
reducing the plurality of BPs to a Noisy Binary Pattern (NBP); and
creating a general binary pattern (genBP) from the NBP.

19. The system of claim 18, wherein calculating the plurality of BPs for a particular point of interest or offset point further comprises:
creating a weighted pattern H from the genBP; and
calculating a region value for the particular point of interest or offset point as:

$$\frac{(L * \sum H)}{144}$$

where L comprises a maximum length of continuous zeros in the genBP.

20. The system of claim 15, wherein the offset points comprise a plurality of pixel locations uniformly shifted in different directions from the particular point of interest.

21. The system of claim 14, wherein determining the quality metric comprises:
creating an ordered list of the points of interest based on respective region values of the points of interest; and
calculating distances between consecutive points of interest in the ordered list.

22. The system of claim 21, wherein determining the quality metric further comprises calculating the quality metric as:

$$\sum_{n=1}^{p} s_n * sw_n * dw_n$$

where p comprises the number of points of interest, $s_n$ comprises the region value calculated for point of interest n, $sw_n$ comprises a weighted index for point of interest n, and $dw_n$ comprises a weight for the distance corresponding to point n in the ordered list.

23. The system of claim 14, wherein the at least a portion of the image of the facial region comprises the ocular region or at least one of the periocular regions.

24. The system of claim 14, wherein the operations further comprise ranking the periocular image regions based on at least one of a respective discriminative power of each periocular image region.

25. The system of claim 24, wherein the operations further comprise using the periocular image regions in a progressive biometric matcher based at least in part on the respective quality metric and/or discriminative power rankings of the periocular image regions.

26. The system of claim 14, wherein the operations further comprise:
   determining that a difference in calculated quality metrics between a first one of the ocular or periocular image regions and a second one of the ocular or periocular image regions exceeds a threshold; and
   indicating a likely presence of a spoof based on the determined difference in calculated quality metrics.

27. A computer-implemented method comprising:
   receiving an image of a facial region of a user, the facial region including an eye and an area surrounding the eye;
   defining an ocular image region including at least a portion of the eye in the image of the facial region;
   defining one or more periocular image regions each including at least a portion of the area surrounding the eye in the image of the facial region;
   identifying a plurality of points of interest in at least one of the ocular image region and the one or more periocular image regions;
   calculating, for each point of interest, a region value for texture surrounding the point of interest, wherein calculating the region value for a particular point of interest comprises:
      calculating at least one local binary pattern in a square-shaped neighborhood (BP) for the particular point of interest;
      calculating at least one BP for one or more points offset from the particular point of interest; and
      setting the region value for texture surrounding the particular point of interest to an average of region values calculated for the particular point of interest and a plurality of the offset points; and
   determining at least one quality metric for at least a portion of the image of the facial region based on the points of interest and the respective calculated region values.

28. The method of claim 27, wherein calculating at least one BP for the particular point of interest comprises calculating a plurality of BPs, each having a different neighborhood, for the particular point of interest, and wherein calculating at least one BP for the offset points comprises calculating a plurality of BPs, each having a different neighborhood, for each offset point.

29. The method of claim 28, wherein calculating the plurality of BPs for a particular point of interest or offset point comprises:
   reducing the plurality of BPs to a Noisy Binary Pattern (NBP); and
   creating a general binary pattern (genBP) from the NBP.

30. The method of claim 29, wherein calculating the plurality of BPs for a particular point of interest or offset point further comprises:
   creating a weighted pattern H from the genBP; and
   calculating a region value for the particular point of interest or offset point as:

$$\frac{(L * \sum H)}{144}$$

where L comprises a maximum length of continuous zeros in the genBP.

31. The method of claim 27, wherein the offset points comprise a plurality of pixel locations uniformly shifted in different directions from the particular point of interest.

32. A system comprising:
   at least one memory for storing computer-executable instructions; and
   at least one processing unit for executing the instructions stored on the at least one memory, wherein execution of the instructions programs the at least one processing unit to perform operations comprising:
      receiving an image of a facial region of a user, the facial region including an eye and an area surrounding the eye;
      defining an ocular image region including at least a portion of the eye in the image of the facial region;
      defining one or more periocular image regions each including at least a portion of the area surrounding the eye in the image of the facial region;
      identifying a plurality of points of interest in at least one of the ocular image region and the one or more periocular image regions;
      calculating, for each point of interest, a region value for texture surrounding the point of interest, wherein calculating the region value for a particular point of interest comprises:
         calculating at least one local binary pattern in a square-shaped neighborhood (BP) for the particular point of interest;
         calculating at least one BP for one or more points offset from the particular point of interest; and
         setting the region value for texture surrounding the particular point of interest to an average of region values calculated for the particular point of interest and a plurality of the offset points; and
      determining at least one quality metric for at least a portion of the image of the facial region based on the points of interest and the respective calculated region values.

33. The system of claim 32, wherein calculating at least one BP for the particular point of interest comprises calculating a plurality of BPs, each having a different neighborhood, for the particular point of interest, and wherein calculating at least one BP for the offset points comprises calculating a plurality of BPs, each having a different neighborhood, for each offset point.

34. The system of claim 33, wherein calculating the plurality of BPs for a particular point of interest or offset point comprises:
   reducing the plurality of BPs to a Noisy Binary Pattern (NBP); and
   creating a general binary pattern (genBP) from the NBP.

35. The system of claim 34, wherein calculating the plurality of BPs for a particular point of interest or offset point further comprises:
   creating a weighted pattern H from the genBP; and
   calculating a region value for the particular point of interest or offset point as:

$$\frac{(L * \sum H)}{144}$$

where L comprises a maximum length of continuous zeros in the genBP.

36. The system of claim 32, wherein the offset points comprise a plurality of pixel locations uniformly shifted in different directions from the particular point of interest.

37. A computer-implemented method comprising:
receiving an image of a facial region of a user, the facial region including an eye and an area surrounding the eye;
defining an ocular image region including at least a portion of the eye in the image of the facial region;
defining one or more periocular image regions each including at least a portion of the area surrounding the eye in the image of the facial region;
identifying a plurality of points of interest in at least one of the ocular image region and the one or more periocular image regions;
calculating, for each point of interest, a region value for texture surrounding the point of interest, wherein calculating the region value for a particular point of interest comprises:
  calculating at least one local binary pattern in a square-shaped neighborhood (BP) for the particular point of interest, wherein calculating at least one BP for the particular point of interest comprises calculating a plurality of BPs, each having a different neighborhood, for the particular point of interest;
  calculating at least one BP for one or more points offset from the particular point of interest, wherein calculating at least one BP for the offset points comprises calculating a plurality of BPs, each having a different neighborhood, for each offset point;
  wherein calculating the plurality of BPs for a particular point of interest or offset point comprises:
    reducing the plurality of BPs to a Noisy Binary Pattern (NBP); and
    creating a general binary pattern (genBP) from the NBP; and
determining at least one quality metric for at least a portion of the image of the facial region based on the points of interest and the respective calculated region values.

38. The method of claim 37, wherein calculating the region value for the particular point of interest further comprises setting the region value to an average of region values calculated for the particular point of interest and a plurality of the offset points.

39. The method of claim 37, wherein calculating the plurality of BPs for a particular point of interest or offset point further comprises:
creating a weighted pattern H from the genBP; and
calculating a region value for the particular point of interest or offset point as:

$$\frac{(L*\sum H)}{144}$$

where L comprises a maximum length of continuous zeros in the genBP.

40. A system comprising:
at least one memory for storing computer-executable instructions; and
at least one processing unit for executing the instructions stored on the at least one memory, wherein execution of the instructions programs the at least one processing unit to perform operations comprising:
  receiving an image of a facial region of a user, the facial region including an eye and an area surrounding the eye;
  defining an ocular image region including at least a portion of the eye in the image of the facial region;
  defining one or more periocular image regions each including at least a portion of the area surrounding the eye in the image of the facial region;
  identifying a plurality of points of interest in at least one of the ocular image region and the one or more periocular image regions;
  calculating, for each point of interest, a region value for texture surrounding the point of interest, wherein calculating the region value for a particular point of interest comprises:
    calculating at least one local binary pattern in a square-shaped neighborhood (BP) for the particular point of interest, wherein calculating at least one BP for the particular point of interest comprises calculating a plurality of BPs, each having a different neighborhood, for the particular point of interest;
    calculating at least one BP for one or more points offset from the particular point of interest, wherein calculating at least one BP for the offset points comprises calculating a plurality of BPs, each having a different neighborhood, for each offset point;
    wherein calculating the plurality of BPs for a particular point of interest or offset point comprises:
      reducing the plurality of BPs to a Noisy Binary Pattern (NBP); and
      creating a general binary pattern (genBP) from the NBP; and
  determining at least one quality metric for at least a portion of the image of the facial region based on the points of interest and the respective calculated region values.

41. The system of claim 40, wherein calculating the region value for the particular point of interest further comprises setting the region value to an average of region values calculated for the particular point of interest and a plurality of the offset points.

42. The system of claim 40, wherein calculating the plurality of BPs for a particular point of interest or offset point further comprises:
creating a weighted pattern H from the genBP; and
calculating a region value for the particular point of interest or offset point as:

$$\frac{(L*\sum H)}{144}$$

where L comprises a maximum length of continuous zeros in the genBP.

43. A computer-implemented method comprising:
receiving an image of a facial region of a user, the facial region including an eye and an area surrounding the eye;
defining an ocular image region including at least a portion of the eye in the image of the facial region;
defining one or more periocular image regions each including at least a portion of the area surrounding the eye in the image of the facial region;
identifying a plurality of points of interest in at least one of the ocular image region and the one or more periocular image regions;

calculating, for each point of interest, a region value for texture surrounding the point of interest; and determining at least one quality metric for at least a portion of the image of the facial region based on the points of interest and the respective calculated region values, wherein determining the quality metric comprises:

creating an ordered list of the points of interest based on respective region values of the points of interest; and calculating distances between consecutive points of interest in the ordered list, wherein the quality metric is calculated as $$\sum_{n=1}^{p} s_n * sw_n * dw_n$$

where p comprises the number of points of interest, $s_n$ comprises the region value calculated for point of interest n, $sw_n$ comprises a weighted index for point of interest n, and $dw_n$ comprises a weight for the distance corresponding to point n in the ordered list.

44. The method of claim 43, wherein the at least a portion of the image of the facial region comprises the ocular region or at least one of the periocular regions.

45. The method of claim 43, further comprising:

determining that a difference in calculated quality metrics between a first one of the ocular or periocular image regions and a second one of the ocular or periocular image regions exceeds a threshold; and indicating a likely presence of a spoof based on the determined difference in calculated quality metrics.

46. A system comprising:

at least one memory for storing computer-executable instructions; and at least one processing unit for executing the instructions stored on the at least one memory, wherein execution of the instructions programs the at least one processing unit to perform operations comprising:

receiving an image of a facial region of a user, the facial region including an eye and an area surrounding the eye;

defining an ocular image region including at least a portion of the eye in the image of the facial region;

defining one or more periocular image regions each including at least a portion of the area surrounding the eye in the image of the facial region;

identifying a plurality of points of interest in at least one of the ocular image region and the one or more periocular image regions;

calculating, for each point of interest, a region value for texture surrounding the point of interest; and determining at least one quality metric for at least a portion of the image of the facial region based on the points of interest and the respective calculated region values, wherein determining the quality metric comprises:

creating an ordered list of the points of interest based on respective region values of the points of interest; and calculating distances between consecutive points of interest in the ordered list, wherein the quality metric is calculated as $$\sum_{n=1}^{p} s_n * sw_n * dw_n$$

where p comprises the number of points of interest, $s_n$ comprises the region value calculated for point of interest n, $sw_n$ comprises a weighted index for point of interest n, and $dw_n$ comprises a weight for the distance corresponding to point n in the ordered list.

47. The system of claim 46, wherein the at least a portion of the image of the facial region comprises the ocular region or at least one of the periocular regions.

48. The system of claim 46, wherein the operations further comprise:

determining that a difference in calculated quality metrics between a first one of the ocular or periocular image regions and a second one of the ocular or periocular image regions exceeds a threshold; and indicating a likely presence of a spoof based on the determined difference in calculated quality metrics.

* * * * *